US011087742B1

(12) United States Patent
Levy et al.

(10) Patent No.: US 11,087,742 B1
(45) Date of Patent: Aug. 10, 2021

(54) TECHNIQUES TO PROVIDE ADAPTIVE FEEDBACK

(71) Applicant: Amazon Technologies, Inc., Seattle, WA (US)

(72) Inventors: Ran Levy, Givataim (IL); Yehuda Finkelstein, Aley-zahav (IL); Iftah Gamzu, Rishon Lezion (IL); Haim Litvak, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 16/439,388

(22) Filed: Jun. 12, 2019

(51) Int. Cl.
*G10L 15/06* (2013.01)
*G10L 15/22* (2006.01)
*G10L 15/16* (2006.01)

(52) U.S. Cl.
CPC ............ *G10L 15/063* (2013.01); *G10L 15/16* (2013.01); *G10L 15/22* (2013.01)

(58) Field of Classification Search
CPC ........ G10L 15/063; G10L 15/16; G10L 15/22
See application file for complete search history.

(56) References Cited

U.S. PATENT DOCUMENTS

| 2016/0180247 | A1* | 6/2016 | Li ......................... G06F 16/906 706/12 |
| 2019/0005575 | A1* | 1/2019 | Zeldin ..................... G06Q 30/08 |
| 2019/0034994 | A1* | 1/2019 | Wu ........................ G06Q 50/01 |
| 2019/0295531 | A1* | 9/2019 | Rao ......................... G10L 13/00 |
| 2020/0089800 | A1* | 3/2020 | Bhojwani ............... G06F 16/23 |

OTHER PUBLICATIONS

U.S. Appl. No. 16/777,082, U.S. Patent Application, "Techniques for Providing Adaptive Responses," filed Jan. 30, 2020.

* cited by examiner

*Primary Examiner* — Fan S Tsang
*Assistant Examiner* — David Siegel
(74) *Attorney, Agent, or Firm* — Kilpatrick Townsend & Stockton LLP

(57) ABSTRACT

Systems and methods are described herein for generating adaptive feedback in response to a user request. Input indicative of a user request may be received and utilized to identify an item in an electronic catalog. A title for the item may be retrieved and provided, as input, to a machine-learning model. The machine-learning model may be trained to identify one or more segments of an input title. A shortened title may be generated from these identified segments and provided as output at the user device (e.g., via audible output provided at a speaker of the user device). In some embodiments, the length and content of the shortened title may vary based at least in part on the contextual intent of the user's request.

20 Claims, 9 Drawing Sheets

US 11,087,742 B1

TECHNIQUES TO PROVIDE ADAPTIVE FEEDBACK

BACKGROUND

It has become commonplace for users to utilize voice commands to interact with various devices. By way of example, users may utilize vocal input to command a device (e.g., a smart speaker, a smart phone, or the like) to perform one or more operations. These devices may be configured to provide audible output as part of performing those operations. By way of example, a user may request a smart device to search for items offered in an online electronic catalog. In response, the device may audibly provide more information than is necessary or helpful to the user. In other examples, the device may not provide enough information in the audible response to enable the user to decipher whether the command was carried out and/or particulars of the operations performed. This can lead to confusion for the user and/or inadvertent errors in operation performance. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
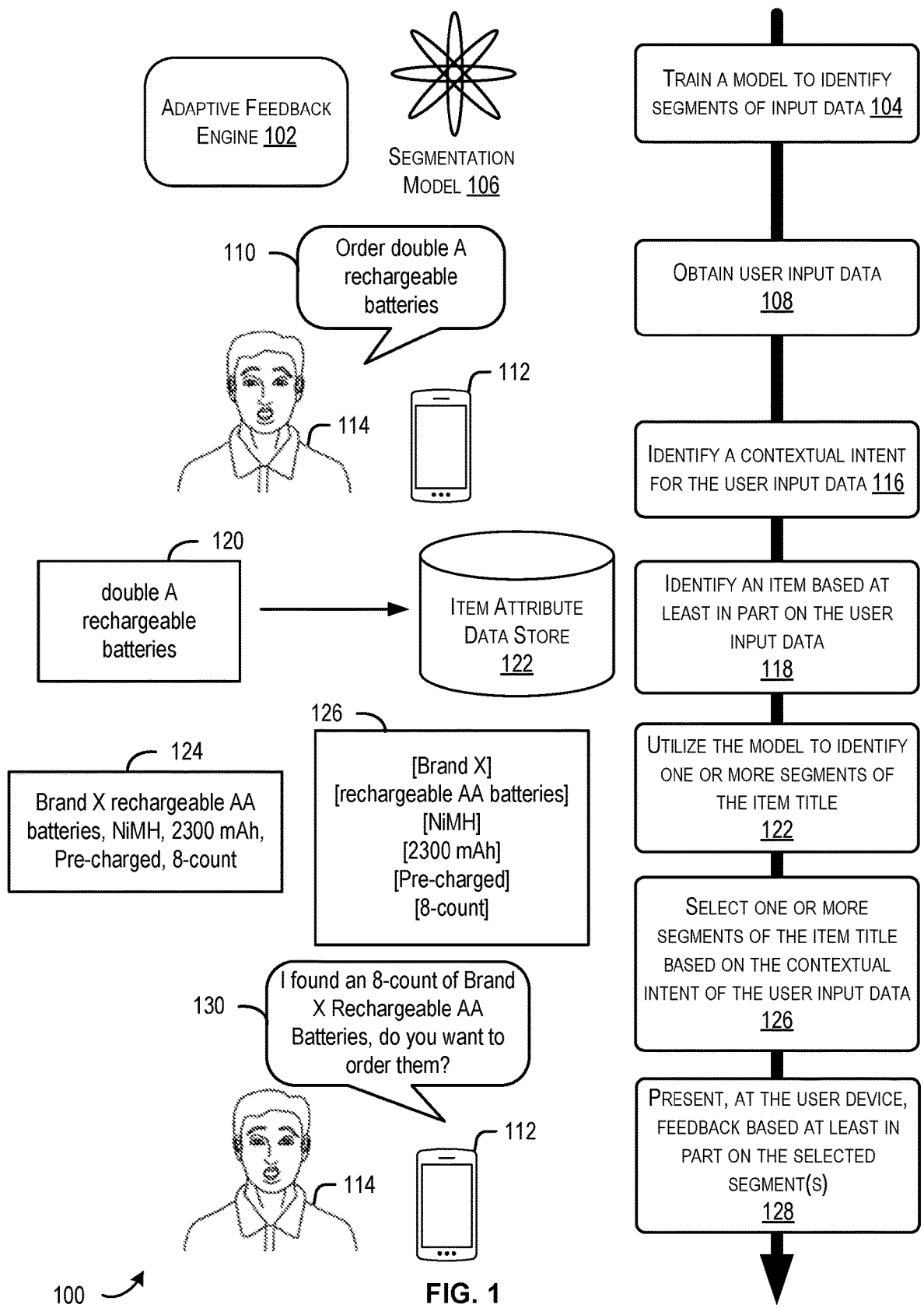
FIG. 1 illustrates an example flow for providing adaptive audible feedback utilizing an adaptive feedback engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to an adaptive feedback engine that may be utilized to generate audio feedback that is generated to suit a particular purpose (e.g., to provide feedback suited to a user request having a particular contextual intent). In some embodiments, the adaptive feedback engine may operate as part of a computerized personal assistant service provided by the service provider which can be accessed by vocal commands provided at a user device (e.g., a smart speaker, a smart phone, a mobile phone, etc.). Some input that may be provided at the user device may relate to an item offered in an online electronic catalog and/or an item associated with a user account corresponding to the online electronic catalog.

According to some embodiments, the user may provide vocal input which is received as sound data at the user device (e.g., via a microphone of the user device). The vocal input/sound data may indicate to a user request (e.g., "I want to buy rechargeable batteries," "cancel my dog food order," "where's my order?", "what are my deals?", "is my watch waterproof?", etc.). A number of tokens (e.g., words, terms, etc.) of the input may be identified using any suitable lexical analysis algorithm. may be utilized by the adaptive feedback engine to identify a contextual intent of the request. In some embodiments, a contextual protocol set (e.g., one or more predetermined rules) may be utilized to determine the contextual intent of the request based at least in part on these tokens (e.g., words, numbers, etc.) and/or combinations of tokens (e.g., phrases). By way of example, particular words, phrases, regular expressions and the like may be identified as tokens of the input. These tokens may be associated with (e.g., mapped) to a particular contextual intent (e.g., a buy intent, a search intent, a cancel order intent, a reorder intent, a product information query intent, a deals intent etc.). In some embodiments, the contextual intent may relate to a particular item associated with the electronic catalog. The adaptive feedback engine may be configured to identify an item related to the contextual intent based at least in part on one or more attributes of items provided in the electronic catalog and/or user information associated with the user account such as historical account data including historical purchase history, historical browsing history, reoccurring orders/subscriptions associated with the user account, and the like. As a non-limiting example, user input such as "reorder my dog food" may be identified as having a reorder intent based at least in part on determining that the word "reorder" is included in the input and/or due to the phrase "my dog food" being included in the input in conjunction with identifying that the user has ordered dog food in the past (e.g., as determined from historical purchase history associated with the user account). In some embodiments, reorder intent may utilize regular expressions to identify whether a matching token is included in the input. As another example, user input such as "what are the deals today?" may be identified as having a deals intent based at least in part on the word "deals" being included in the request.

Upon identifying an item and the contextual intent of the user request, the adaptive feedback engine may obtain a particular attribute of the item, such as the title of the item. The title may include any suitable text including, but not limited to, alphanumeric characters, symbols, punctuation marks, and the like. In some embodiments, the title of an item may be relatively long and may include segments that correspond to differing attributes of the item. A "segment" as used herein is intended to refer to a combination of one or more tokens (e.g., words, word sequences, strings of characters, etc.) that relate to one another. In some embodiments, a segment of one or more tokens may relate to a particular attribute of the item (e.g., brand, product type, price, pack size, dimensions, etc.). By way of example, an item may have a title such as "Brand X, AA rechargeable batteries, 8 count, $22.99—Long lasting and dependable!" "Brand X" may be considered a segment which includes two tokens that relate to the item's brand. "AA rechargeable batteries" may be considered another segment which includes three tokens that relate to the item's product type. "8 count" may be another segment that includes two tokens related to pack size of the item. "$22.99" may be another segment that relates to a price of the item. Finally, "long lasting and dependable" may be another segment including four tokens. This segment may not relate to any particular item attribute.

The adaptive feedback engine may utilize a machine-learning model to identify one or more segments of the title. The machine-learning model may have been previously trained utilizing supervised learning techniques and a training set including titles for which segments were known, to identify one or more segments of data provided as input to the model. One or more tokens may be identified as relating to one another to each other (and thus, considered a part of the same segment) based at least in part on a topic, a phrase, an attribute category of an item (e.g., brand, product type, price, etc.) or any suitable manner. In some embodiments, the adaptive feedback engine may be configured to generate a shortened title for the item based at least in part on the one or more segments of input data identified by the machine-learning model and the contextual intent identified for the user input.

In some embodiments, the adaptive feedback engine may consult a predefined mapping of types of shortened titles (e.g., long, medium, short) to corresponding contextual intents (e.g., buy intent, reorder intent, cancel intent, etc.) in order to identify a type of shortened title to be utilized when providing a response to the user request. By way of example, the mapping may indicate that a response to a user request that is identified as having the contextual intent to buy an item (e.g., buy intent) is to utilize a long title, while a response to a user request that is identified as having a different contextual intent (e.g., reorder intent, cancel intent, etc.) is to utilize a shortened title of a different type (e.g., a medium title, a short title, etc.). It should be appreciated that a type associated with a shortened title may refer to a title length (e.g., as measured in words, terms, tokens, segments, etc.) and/or the type may refer to a selection protocol to be utilized to generate the shortened title (e.g., a set of predetermined selection rules associated with generating a long title, a different set of predetermined selection rules associated with generating a short title, etc.). The adaptive feedback engine may generate a shortened title of the prescribed type according to the selection protocol (or portion of the selection protocol) associated with that type. In some embodiments, a separate machine-learning model may be trained to select segments for a shortened title utilizing historical titles and segments for which an ideal title (e.g., a combination of one or more of the segments) has been identified.

The adaptive feedback engine may provide the shortened title as part of a response provided at the user device. By way of example, the user may provide vocal input at the user device such as "order rechargeable double A batteries." The adaptive feedback engine can identify the input as having a buy intent and that a particular type of shortened title (e.g., a long title) is to be utilized based on that particular contextual intent. The adaptive feedback engine can be configured to utilize some portion of the input (e.g., "rechargeable double A batteries") to perform a search of the electronic catalog (and/or in some instances the historical purchase history, reorder history, reoccurring order subscriptions, etc.) to identify a particular item. An attribute such as the title of the item may be obtained from a database associated with the electronic catalog and configured to store one or more attributes associated with the items offered in the electronic catalog (and/or user information associated with a user account). By way of example, the item title obtained may be "Brand X, AA rechargeable batteries, 8 count, $22.99—Long lasting and dependable!" The title may be submitted to the machine-learning model which may identify the segments of the title as [Brand X], [AA rechargeable batteries], [8 count], [$22.99], and [Long lasting and dependable]. Based on the type of shortened title to be used (as determined from the contextual intent), the adaptive feedback engine may generate a shortened title for the item (e.g., "Brand X AA, rechargeable batteries, 8 count"). In some embodiments, the adaptive feedback engine may generate a response to be presented at the user device that utilizes the shortened title. For example, the response provided at the user device may be "I found Brand X AA rechargeable batteries, 8 count. This item is $22.99 including tax. Would you like to buy it?"

By utilizing the techniques provided herein, responses may be provided which are adapted/customized based on the context/intent of the user's request. It may be that a person who is requesting to buy an item may desire to be provided more item details (e.g., corresponding to a longer title) than someone who is canceling, because a person cancelling an order is already familiar with the item due to their previous purchase of the item. Accordingly, the information provided in the title of an item may be more informative when the context indicates a buy intent than when the context indicates a cancel order intent. This may improve the user's experience as the amount of information provided in response to a request is tailored to include information that is helpful for that type of request. Accordingly, the user can avoid being inundated with superfluous information that does not aid him in his task. The techniques described herein may further reduce the likelihood of confusion and/or of executing operations that the user did not intend.

Moving on to FIG. 1 which illustrates a flow 100 for providing adaptive feedback utilizing an adaptive feedback engine 102, in accordance with at least one embodiment. The flow 100 depicts an example in which adaptive feedback is provided in response to user input related to an item provided in an electronic catalog.

The flow 100 may begin at 104, the adaptive feedback engine 102 may train a machine-learning model (e.g., segmentation model 106) to identify segments of input data. In some embodiments, the machine-learning model may be trained utilizing a training set including one or more titles for which corresponding segments are already known. The machine-learning model may be trained utilizing any suitable machine-learning techniques (e.g., supervised learning techniques, regression analysis, classification algorithms, etc.). In some embodiments, the machine-learning model is an artificial neural network (e.g., a feed forward artificial neural network).

At 108, user input data 110 may be obtained at a user device (e.g., the user device 112). The user device 112 may be depicted as a mobile phone, but it should be appreciated that other devices (e.g., a smart speaker, a smart watch, a PDA, etc.) may be utilized. As a non-limiting example, the user 114 may vocally provide the statement "order double A rechargeable batteries" which can be received as sound input by an input device (e.g., a microphone) of the user device 112. Although sound data/vocal input are used in a variety of examples herein, it should be appreciated that similar techniques may be utilized using data of other formats (e.g., textual data). In some embodiments, the user input data 110 may be converted to textual format at any suitable time utilizing any suitable speech-to-text algorithm. Accordingly, the user input data 110 may be converted data in subsequent steps of the flow 100.

At 116, a contextual intent for the user input data 110 may be identified. As used herein a "contextual intent" (also referred to herein as "intent" or "conversational context") is intended to refer to an indication of the user's intent with respect to providing the user input data 110. For example, the user's input may be indicative of an attempt to purchase an item, a task which may be associated with a buy intent (a type of contextual intent). To identify the contextual intent of the user input data 110, the user input data 110 may be tokenized to identify a number of tokens (e.g., words, strings of characters, etc.) within the user input data 110. The tokenization of the user input data 110 may utilize any suitable lexical analysis algorithm. In some embodiments, a contextual protocol set (e.g., one or more predetermined rules) may be utilized to determine the contextual intent of the user input data 110 based at least in part on these tokens (e.g., words, numbers, etc.) and/or combinations of tokens (e.g., phrases). By way of example, the contextual protocol set (or contextual protocol for brevity) may specify particular words, phrases, regular expressions and the like as being associated with (e.g., mapped) to a particular contextual intent (e.g., a buy intent, a cancel order intent, a reorder intent, etc.).

At 118, an item may be identified based at least in part on some portion of the user input data 110. By way of example, a query 120 (derived from user input data 110) may be submitted to an item attribute data store 122 (e.g., a data store configured to store item attributes for items of an electronic catalog) to identify one or more items corresponding to the query 120. In some embodiments, the query 120 may be derived by removing words, terms, and/or phrases that correspond to a predetermined list of words, terms, phrases, and/or regular expressions. In some embodiments, a particular item may be selected based at least in part a degree to which the item relates to the query (e.g., a relevancy score) and/or browsing history of the user, purchase history of the user, user preferences, etc. associated with a user account (e.g., a user account maintained by a provider of the electronic catalog). In some embodiments, more than one item may be returned by executing the query 120 and an item having a highest score relevancy score may be selected. Upon identifying an item, the adaptive feedback engine may obtain a particular attribute of the item, such as the item title 124. Item title 124 may include any suitable text including, but not limited to, alphanumeric characters, symbols, punctuation marks, and the like. In some embodiments, the title of an item may be relatively long and may include segments that correspond to differing attributes of the item. By way of example, item title 124 may include "Brand X, AA rechargeable batteries, NiMH, 2300 mAH, pre-charged—8 count".

At 122, a machine-learning model (e.g., the segmentation model 106) may be utilized to identify one or more segments of item title 124. By way of example, segments 126 may be identified by the machine-learning model from the item title 124.

At 126, one or more segments may be selected based on the contextual intent of the user input data 110. In some embodiments, the adaptive feedback engine 102 may maintain a mapping that identifies associations between a particular contextual intent and a particular type of shortened title. Each type of shortened title may be associated with a corresponding set of rules (e.g., a subset of rules of a selection protocol) that specifies the manner in which particular segments are to be selected (e.g., to generate a shortened title) from the one or more segments identified at 122. It should be appreciated that, in some embodiments, the shortened title may be generated as output of a machine-learning model that has been previously trained to identify shortened titles from input titles. In some embodiments, this machine-learning model may be separate from the segmentation model 106 and trained based on a training data set including any suitable number of titles, for which appropriate shortened titles are already identified. In some embodiments, a contextual intent may be associated with the shortened title and the machine-learning model may be trained to identify a shortened title from an input title utilizing additional input such as the contextual intent related to the request for a shortened title. Thus, as described herein "a selection protocol" is intended to include a machine-learning model that has been trained in this manner. The selection protocol may be discussed in further detail below with respect to FIG. 3. In some embodiments, the adaptive feedback engine may generate a shortened title from the selected segment(s) and in accordance with one or more rules of the selection protocol (e.g., particular segments related to particular item features are to be selected and arranged in a particular order, etc.). In cases in which a machine-learning model is utilized to generate a shortened title, the adaptive feedback engine may be configured to received such data.

At 128, feedback 130 may be presented to the user at the user device 112 based at least in part on the selected segment(s). In some embodiments, this may include presenting feedback that includes the generated shortened title. In other embodiments, presentation may include presenting each selected segment as part of the feedback 130. By way of example, the segments selected from segments 126 may include [Brand X], [Rechargeable AA Batteries], and [8-count]. The adaptive feedback engine may provide the shortened title (e.g., "Brand X, Rechargeable AA Batteries, 8-count") as part of a response provided at the user device and/or the adaptive feedback engine may provide the selected segments in any suitable order. For example, the feedback "I found 8-count Brand X Rechargeable AA Batteries, do you want to order them?" may be audibly presented to the user 114 at the user device 112. In this manner, the feedback provided by the adaptive feedback engine 102 may be adapted to conform to the intent of the original input data.

Figure 2:
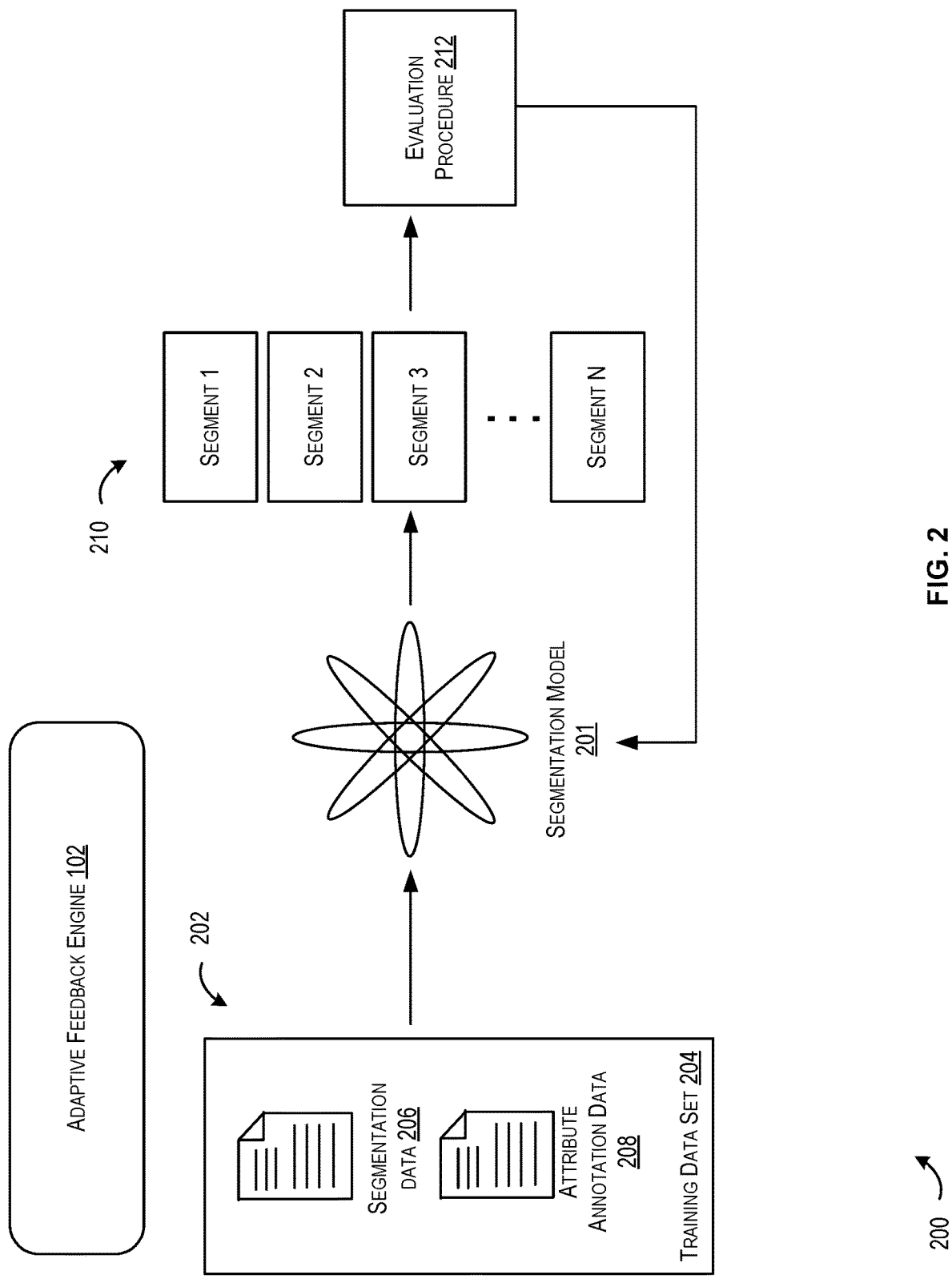
FIG. 2 illustrates an example process for training a segmentation model, in accordance with at least one embodiment.

FIG. 2 illustrates an example process 200 for training a segmentation model 201 (e.g., the segmentation model 106 of FIG. 1), in accordance with at least one embodiment. The process 200 may be performed by the adaptive feedback engine 102.

In some embodiments, the process 200 may begin at 202, where the adaptive feedback engine 102 (or a component thereof) may obtain training data set 204. Training data set 204 may include any suitable data with which segmentation model 201 may be trained to identify one or more segments from input data (e.g., a title associated with an item). By way of example, training data set 204 may include segmentation data 206 and, in some cases, attribute annotation data 208.

Segmentation data 206 may include any suitable number of titles and corresponding sets of segments previously derived from the titles. In some embodiments, the segments may be specified in any suitable manner. By way of example, each of the tokens of a title may be provided sequentially as found in the title. A label of "1" (or another suitable value) may be utilized to indicate tokens that open (begin) a segment and a label of "0" (or another suitable value) may be utilized to indicate tokens that do not open a segment. The segments may be derived by starting with an opening token and concatenating each subsequently occurring token in the title between that opening token and the next opening token. As another example, a segment may be indicated using a set of tokens where deriving the segment as described above is unnecessary.

Attribute annotation data 208 may include attributes labels associated with each segment of a title (or in some cases each opening token) that indicates an association with an attribute category of an item. Attribute categories may include, but are not limited to, brand, product time, size (e.g., size 4), pack size (e.g. pack of 60), specialty (e.g. sugar-free), length (e.g. 4 inches), weight (e.g. 60 pounds), volume (e.g. 100 gallons), capacity (e.g. 32 GB), dimension (e.g. 5 inch×10 inch), power (e.g. 25 Watt), model (e.g. C2SA-YS02), product condition (e.g., refurbished), or any suitable attribute category configured to describe a type of item attribute.

It should be appreciated that not all segments of a title will be associated with an attribute label. It is contemplated that one or more segments do not correspond with any particular attribute category. Accordingly, these segments may include no associations to an attribute label or these segments could be associated with an attribute label that indicates the segment does not correspond with any of the previously specified item attributes.

In some embodiments, the segmentation data 206 and/or the attribute annotation data 208 may be predefined and/or any suitable combination of the segmentation data 206 and attribute annotation data 208 may be obtained from a crowdsourcing platform. A crowdsourcing platform is intended to refer to a system (or a component of the adaptive feedback engine 102) that is configured to provide one or more user interfaces with which a plurality of crowdsourcing platform users (sometimes called a crowd-sourced group of users) may review a title and manually identify segments of the title. In some embodiments, the training data set may be derived from a larger set of item data (e.g., titles). In some embodiments, these user interfaces may further enable the user to provide an attribute category for one or more segments that identifies a type of item attribute (e.g., brand) to which the segment relates.

The crowdsourcing platform (or the adaptive feedback engine 102 hosting a crowdsourcing platform) can be configured to identify when the same segment(s) derived from a title (e.g., a same segment including the same number of tokens/words that are in the same sequence) have been identified over a threshold number of times and/or by over a threshold percentage (e.g., over 50%, over 75%, etc.) of all users that have been presented that particular title. If so, that title and its identified segments may be added to the training data set 204. Similarly, the crowdsourcing platform (or the adaptive feedback engine 102) can be configured to identify when the same attribute category (e.g., brand, product time, dimensions, etc.) have been assigned by crowdsource users over a threshold number of times and/or by over a threshold percentage (e.g., over 50%, over 75%, etc.) of all users that have been presented that particular title and/or those users that have assigned the segment an attribute category. If so, that attribute category may be included in the training data set 204 with the attribute annotation data 208. It should be appreciated that the segmentation data 206 and the attribute annotation data 208 for a given item (or item title) may be stored in separate containers (e.g., a mapping of attribute category to a particular segment of a particular title and a list of token indexes (e.g., word indexes) that identify a particular token as being a beginning token of a segment) or a common container (e.g., a single item or item title object). Additionally, the segmentation model 106 may be trained utilizing only the segmentation data 206 to identify segments of the input data. In some embodiments, a separate machine-learning model (e.g., an attribute category model not depicted) may be trained using the attribute annotation data 208 to identify one or more categories of one or more segments.

In some embodiments, the adaptive feedback engine 102 may be configured to filter one or more titles from the training data set 204. For example, titles in which the ratio of tokens that are identified (e.g., previously, by a crowdsourcing platform, etc.) as the beginning of a segment may be divided by the total number of tokens within the title. In some embodiments, if the resultant value does not meet or exceed a threshold value (e.g., over 0.15 to indicate that over 15% of the tokens open a segment), the adaptive feedback engine 102 may be configured to filter the title (or otherwise not include the title) in the training data set 204. As another example, the adaptive feedback engine 102 may be configured to filter and suitable segmentation data and/or attribute annotation data from the training data set 204 for titles that include a number of tokens that does not fall in a predetermined number range (e.g., 5-15 tokens). By utilizing these filtering techniques, the adaptive feedback engine 102 may improve the quality of data included in the training data set as data that is of an optimal length and has an optimal number of segments within each title.

Any suitable portion of the training data set 204 may be utilized to train the segmentation model 201. In some embodiments, the training may utilize any suitable supervised machine-learning technique. A supervised machine-learning technique is intended to refer to any suitable machine-learning algorithm that maps an input to an output based on example input-output pairs. A supervised learning algorithm (e.g., decision trees, reinforcement-based learning for artificial neural networks, distance functions such as nearest neighbor functions, regression analysis, etc.) may analyze the training data and produce an inferred function (also referred to as "a model"), which can be used identifying an output for a subsequent input. Accordingly, by executing the supervised learning algorithm on the training data set 204, the segmentation model 201 may be trained to identify one or more segments (and attribute categories for those segments) from subsequent input data (e.g., subsequently provided item titles).

In some embodiments, the segmentation model 201 may be a feed forward artificial neural network with one hidden layer atop of a trainable embedding layer. A feed forward neural network may be an artificial neural network wherein connections between the nodes in the neural network do not form a cycle. In this type of neural network, the information moves in only one direction, forward, from node to node. In some embodiments, the segmentation model 201 may identify a subset of the input data (e.g., five tokens in the order in which they appear in the title). The segmentation model 201 may evaluate the tokens to identify whether a center token opens a segment or not. By way of example, a window including token 1, token 2, token 3, token 4, and token 5 may be evaluated to determine whether token 3 opens (e.g., begins) a segment or not. If the token is identified as opening a segment, the token may be associated with a segment label (e.g., with a "1") to indicate it is the first token of a segment, else the token may be otherwise labeled (e.g., with a "0") or otherwise remain unassociated with a label to indicate that it is not the first token of a segment. In some embodiments, the subset of input data may change according to a sliding window. It should be appreciated that at least some of the tokens in the window may include a special character inserted by the system. For example, a 5-token window for evaluating the first word in a title may include 2 special symbols in the first and second position of the window, followed by the first token in the title, the second token in the title, and a third token in the title, respectively. A second evaluation may occur for the second token in the title using a window including a symbol denoting a padded value, the first token in the title, followed by the second, third, and fourth tokes of the title, respectively. The window may be moved at each evaluation until all tokens in the title have been evaluated. The last evaluation may be of token 5 and the window may include token 3, token 4, token 5, following by two special symbols indicating padded values. In this manner, each token (e.g., word) of the input data may be evaluated and labeled as opening a segment or not according to at least some of the surrounding tokens (e.g., some tokens that precede the token in the title and/or some tokens that subsequently occur in the title). A segment may then be identified corresponding to each token that was identified as an opening token. Each segment may include a token indicated as opening a segment and every sequential token occurring after the opening token until another token that opens a segment is reached in the title.

Once trained, a title from the training data set 204 may be provided to the segmentation model and a number of segments (e.g., segments 1-N, collectively referred to as segments 210) may be identified. These segments may be utilized for an evaluation procedure 212 to evaluate the quality of the segmentation model 201 with respect to accuracy of the segment(s) identified from the title and/or the accuracy of the attribute category identified for each segment. The output of the title (e.g., segments 210) and/or an attribute category (e.g., brand) indicating a particular item attribute to which the segment relates may be compared to the corresponding data associated with the title and included in the training data set 204 to identify whether the segmentation model 201 identified segment(s) and/or attribute categories that match those found in the training data set 204 and associated with the title being analyzed. If 90 out of 100 titles had a set of segments identified by the model match those found in the training data set 204, then the segmentation model 201 may be considered 90% accurate. In some embodiments, if the accuracy is determined to be at or below a threshold value (e.g., 50% indicating it is just as likely the segment/attribute category is incorrect as it is that the segment/attribute category is correct), the adaptive feedback engine 102 may be configured to adjust the training data set 204 (e.g., obtain additional input from crowdsourcing platform users) and retrain the segmentation model 201. This process may occur any suitable number of times until the segmentation model 201 is identified by the evaluation procedure 210 as accurate over a threshold percent (e.g., 90% indicating that the model identifies the same segments as found in the training data set 204 for 90% of the inputs provided).

As another example, the accuracy of the segmentation model 201 may be evaluated by identifying, for each token of the title, if the segment label (e.g., an indicator such as a 0 or 1 that identifies whether the token opens a segment or not) for each token was accurately assigned based at least in part on crowdsourced input. By way of example, part of the evaluation procedure 212 may include obtaining feedback from one or more crowdsourcing platform users identifying whether a segment, a set of segments, segment labels of a title, and/or an attribute category for a given title have been accurately identified by the model. Any suitable user interfaces provided by the adaptive feedback engine 102 may be utilized to solicit feedback from the crowdsourcing platform users. In some embodiments, the feedback may indicate one or more reasons the segment(s), segment label(s), and/or attribute category was inaccurate. For example, the adaptive feedback engine 102 may obtain data from the crowdsource platform corresponding to segment labels of each token of any suitable number of title. The number of correctly identified segment labels may be totaled and averaged (e.g., divided) by a number representing the number of tokens across all titles utilized. As yet another example, the segments identified by the segmentation model 106 may be compared to segments identified by the crowdsource users and the number corresponding to a match may be divided by a number of total predicted segments to calculate a precision value. A recall value may be calculated by determining the number of predicted segments that exactly match the crowdsource user-identified segments and dividing by the crowdsource user-identified segments. An overall accuracy value can be then calculated by obtaining the harmonic mean between the precision value and the recall value and averaging the result across all titles. The segmentation model 201 may be deemed to be accurate (and therefore deployable/usable) when the accuracy value meets and/or exceeds a predetermined threshold value.

In some embodiments, the evaluation procedure 212 may occur at any suitable time as new training data is generated. By way of example, as the segmentation model 201 identifies subsequent segments and/or attribute categories of a title, this new data may be included in the training data set 204 and filtered as described above to form an updated version of the training data set 204. Periodically and/or according to a schedule, the adaptive feedback engine 102 may be configured to retrain the segmentation model 201 utilizing the updated version of the training data set 204.

The process 200 may be performed any suitable number of times at any suitable interval and/or according to any suitable schedule such that the accuracy of segmentation model 201 is improved over time.

Figure 3:
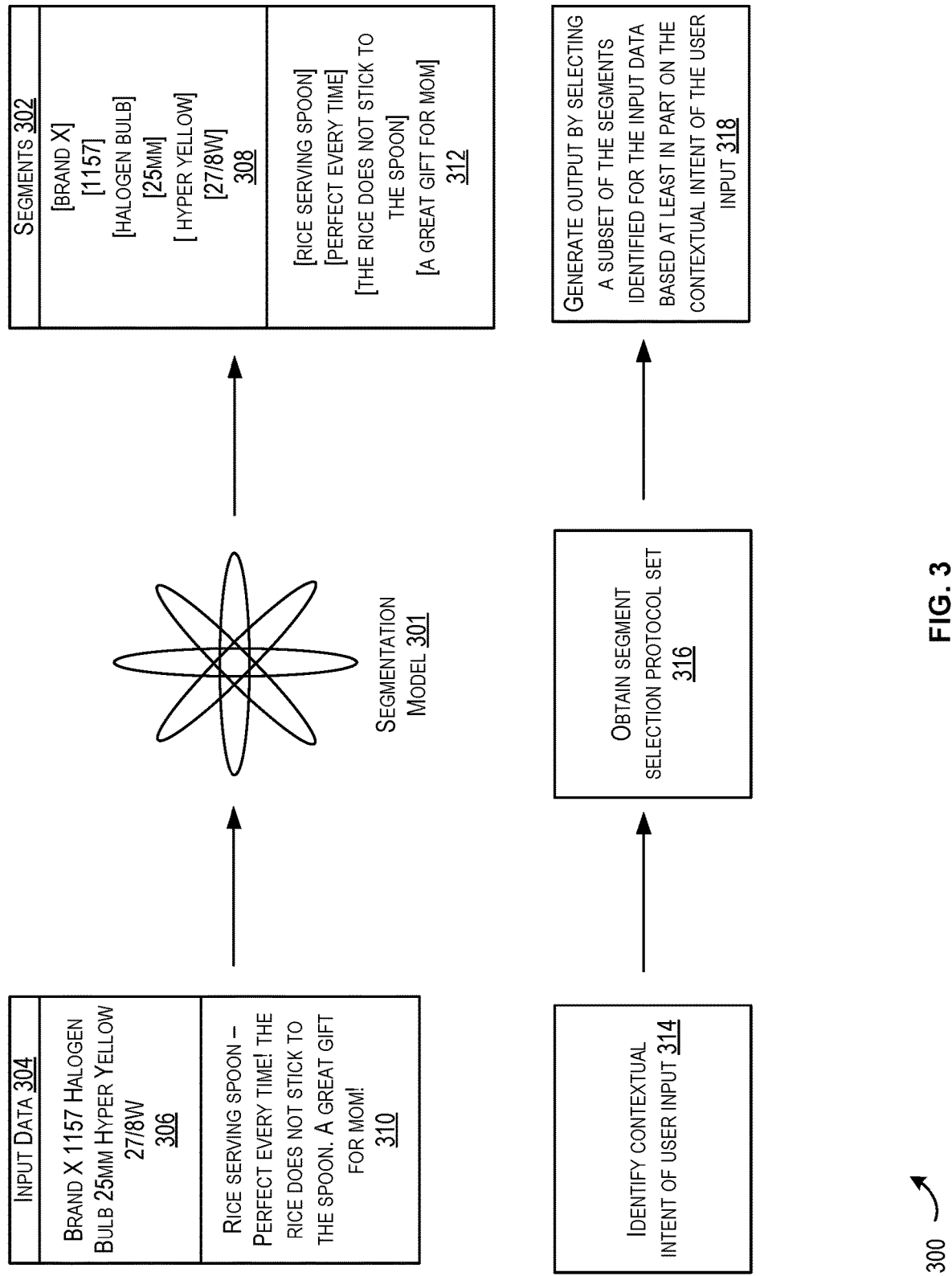
FIG. 3 illustrates an example segment selection process which utilizes a selection protocol set, in accordance with at least one embodiment.

FIG. 3 illustrates a flow 300 for a segment selection process which utilizes a selection protocol set, in accordance with at least one embodiment. The segment selection process may be performed by an adaptive feedback engine (e.g., the adaptive feedback engine 102 of FIGS. 1 and 2). In some embodiments, the process 200 of FIG. 2 may be previously performed to train the segmentation model 301 (e.g., an example of the segmentation model 102 of FIG. 1 and/or the segmentation model 201 of FIG. 2) to identify segments 302 from input data 304.

By way of example, the segmentation model 301 may be configured to accept input data 306 (e.g., an item title) as input and to identify and provide segments 308. Although not depicted, one or more of segments 308 may be further associated with an attribute category (e.g., brand, product type, general, specialty etc.). By way of example, the segment [Brand X] [1157] may be determined to be associated with an attribute category of "brand," indicating the segment relates to a brand associated with item. Each segment may be assigned a corresponding attribute category by the segmentation model 301 and/or a subset of the segments 308 may be assigned a corresponding attribute category. Similarly, segmentation model 301 may be utilized to identify segments 312 from input data 310. In some embodiments, the segments identified by the segmentation model 301 may be analyzed with respect to a predefined list of words, phrases, regular expressions and the like that are associated with particular attribute categories. If a segment is identified as including at least one of the words/phrases/regular expressions associated with a particular attribute category, the segment may be associated (labeled) as being related to a particular item attribute type (e.g., brand, product type, price, etc.). Accordingly, the segments may be assigned an attribute category after being identified by the segmentation model 301 as an alternative to training the segmentation model 301 to identify the attribute categories of a segment.

The segment selection process may begin at 314, where a contextual intent of user input may be identified. As described above, a contextual protocol set (e.g., one or more predetermined rules) may be utilized to determine the contextual intent of the request based at least in part on these tokens (e.g., words, numbers, etc.) and/or combinations of tokens (e.g., phrases). By way of example, particular words, phrases, regular expressions and the like may be identified as tokens of the input. These tokens may be associated with (e.g., mapped) to a particular contextual intent (e.g., a buy intent, a search intent, a cancel order intent, a reorder intent, etc.). In some embodiments, the contextual intent may relate to a particular item associated with the electronic catalog. The adaptive feedback engine may be configured to identify an item related to the contextual intent based at least in part on one or more attributes of items provided in the electronic catalog and/or user information associated with the user account such as historical purchase history, historical browsing history, reoccurring orders/subscriptions associated with the user account, and the like.

At 316, a segment selection protocol set may be obtained. A segment selection protocol set (also referred to as a "selection protocol" or "segment selection protocol" for brevity) identify a set of rules for segment selection (e.g., selection corresponding to a long title, a medium title, a short title, etc.) based at least in part on the contextual intent identified at 314. In some embodiments, the adaptive feedback engine may consult a predefined mapping contextual intents (e.g., buy intent, reorder intent, cancel intent, etc.) to an identifier for the segment selection rules to be utilized for segment selection (e.g., "long title," "short title," "medium title," etc.). There can be any suitable number of segment selection rules corresponding to any suitable number of contextual intents. in order to identify a type of shortened title to be utilized when providing a response to the user request.

By way of example, the mapping may indicate that input data identified as having the contextual intent to buy an item (e.g., buy intent) is to utilize segment selection rules (e.g., rules corresponding to selecting segment based on generating a long title, a first set of segment selection rules, etc.), while input data that is identified as having a different contextual intent (e.g., reorder intent, cancel intent, etc.) is to utilize another set of segment selection rules (e.g., a set of rules that differ from the first set of segment selection rules above, a set of rules for segment selection for generating a medium title, or yet another set of rules for segment selection to be used for generating a short title, etc.). It should be appreciated that terms "long," "short," and "medium" discussed with respect to an item title may refer to a particular title length (e.g., as measured in characters, words, terms, tokens, segments, etc.) and/or the terms "long," "short," and "medium," among others, may refer to the selection protocol to be utilized. Alternatively, or in addition, types of output title need not be limited to "short," "medium" and "long," and need not be limited to output title length, but may include any suitable type of title and/or any suitable title characterization criteria.

As a non-limiting example, a selection protocol (e.g., a "short" selection protocol) may be predetermined with the goal of providing a relatively short title that still conveys a particular type of information (e.g., a product type) of the item. The selection protocol may specify that the shortened title is not to exceed a threshold number of tokens (e.g., 5 tokens, 6 tokens, etc.). In some embodiments, if a segment (e.g., one or more tokens) associated with a particular item attribute (e.g., product type) is not found within the title, the selection protocol may specify that no shortened title can be generated. Other the other hand, if a segment associated with that particular item attribute (e.g., product type) is found, the selection protocol may specify that that segment is to be utilized as a shortened title so long as the segment does not exceed a maximum number of tokens (e.g., 5 tokens, 3 tokens) as defined in the selection protocol. It should be appreciated that, in some embodiments, if a shortened title is not generated as a result of the rules of one selection protocol, additional rules of the selection protocol may identify different selection rules that may be utilized as a default to produce a shortened title. As a non-limiting example, if the title does not contain a segment associated with a product type attribute, the selection protocol may identify other rules (e.g., associated with the "medium" selection protocol discussed below) to be executed to generate a shortened title for the item.

As another non-limiting example, a selection protocol (e.g., a "medium" selection protocol) may be predetermined with the goal of providing a shortened version of the title while enforcing a degree of preference with respect to the attributes to which segments of the title may relate. In some embodiments, the selection protocol may further specify rules that cause segments occurring nearer the beginning of a title to be preferred over segments occurring later in the title. As a non-limiting example, the selection protocol may specify that the segments of the title be split into any suitable number of categories (e.g., 3). One category (Category 1) may be utilized to indicate that corresponding segment(s) were determined to be associated with a preferred set of attribute types (e.g., a set including product type, a set including product type, brand, and product condition, etc.). Another category (Category 2) may be utilized to indicate that corresponding segments were determined to be associated with attribute types that differ from the preferred set of attribute types. Another category (Category 3) may be utilized to indicate corresponding segments without a detected attribute type (e.g., segments that were not determined to be associated with any predefined attribute category).

As a non-limiting example, one selection protocol may specify that the segments of the title are to be categorized as being a part of Category 1, Category 2, or Category 3 discussed above. In some embodiments, the selection protocol may specific that segments of Category 2 are to be discarded. Of the remaining tokens, the selection protocol may specific that segments are to be selected one at a time, from left to right, until the selected segment(s) collectively include or exceed a minimum threshold number of tokens (e.g., the shortened title includes at least four tokens). The selection protocol may specify that if the selected segments (after exceeding four tokens) exceed a maximum threshold number of tokens (e.g., eight tokens), no shortened title can be generated. However, if the selected segments collectively include a number of tokens that meets or exceeds the minimum threshold and does not exceed the maximum threshold, the selection protocol may specify that the selected segments are to be returned. In some embodiments, the selected segments may be concatenated and provided as a shortened title (e.g., a string of segments).

As another example, given the same categories discussed above in the preceding example, the selection protocol may specify that the segments of the title are to be categorized as being a part of Category 1, Category 2, or Category 3 discussed above and that segments associated with Category 2 are to be discarded. Of the remaining segments, the selection protocol may specific that segments are to be selected one at a time, from left to right, until one or more segments associated with one or more particular attribute types (e.g., product type and brand) have been selected. the selection protocol may further specify that if the set of selected segments include segments associated with the required type(s) and the selected segments collectively contain a number of tokens that does not exceed a maximum threshold (e.g., eight token), the selected segments may be returned (and/or a shortened title may be generated from concatenating the selected segments and the shortened title returned). The selection protocol may specify that if the set of selected segments do not include segments associated with the required type(s) and/or the selected segments collectively contain a number of tokens that exceeds the maximum threshold (e.g., eight token), none of the selected segments are to be returned (and/or no shortened title may be generated).

It should be appreciated that the selection protocol may identify another default selection protocol (e.g., a "long" selection protocol) to be utilized to attempt segment selection (and/or shortened title generation) in the situation that a determination is made that the selected segments are not to be returned and/or a shortened title is not to be generated.

As another non-limiting example, a selection protocol (e.g., a "long" selection protocol) may specify rules for discarding segments according to a preference associated with various attribute types. The selection protocol may specify that the segments of the title be split into any suitable number of categories (e.g., 3). One category (Category 1) may be utilized to indicate that corresponding segment(s) were determined to be associated with a preferred set of attribute types. Another category (Category 2) may be utilized to indicate that corresponding segments were determined to be associated with attribute types that differ from the preferred set of attribute types. Another category (Category 3) may be utilized to indicate corresponding segments without a detected attribute type (e.g., segments that were not determined to be associated with any predefined attribute category). The selection protocol may define rules that cause segments occurring nearer the beginning of the title to be preferred to those occurring later in the title. In some embodiments, the selection protocol may further include a predefined threshold number of tokens (e.g., 12 token) that may be included in a shortened title. Thus, the selection protocol may provide rules that return selected segments (or a shortened title generated by concatenating the selected segments) only when the threshold has not been exceeded.

In one example, the preferred set of attribute types of Category 1 may include brand, pack-size, weight, volume, and product-condition, although the particular preferred attribute types may vary. The selection protocol may specify that all segments of Category 1 may be selected. If the selected segments of Category 1 collectively include a number of tokens that exceed the threshold (e.g., 12 tokens) the selection protocol may specify that the selected segments are not to be returned (and/or a shortened title is not to be generated). If the currently selected segments do not exceed the threshold value, the selection protocol may specify that additional segments are to be selected (other than those already selected) by traversing the title from left to right until the selected segments collectively include a number of tokens that exceeds the threshold (e.g., the selected segments include 12 or more tokens). The selection protocol may specify that the last selected segment that caused the threshold to be exceeded is to be deselected. In some embodiments, if the selected segments now contain less than a second threshold (e.g., 6) number of tokens from segments associated with Category 3, the selection protocol may specify that a shortened title is not to be generated and/or the selected segments are not to be returned. Otherwise, the selection protocol may order the selected segments according to an order of the original title and return the selected segments (or a shortened title generated by concatenating the selected segments).

As another example, the preferred set of attribute types of Category 1 may include brand, product-type, pack-size, weight, volume, and product-condition, although the particular preferred attribute types may vary. The selection protocol may specify that all segments of Category 1 may be selected. If the selected segments of Category 1 collectively include a number of tokens that exceed the threshold (e.g., 12 tokens) the selection protocol may specify that the selected segments are not to be returned (and/or a shortened title is not to be generated). If the currently selected segments do not exceed the threshold value, the selection protocol may specify that additional segments are to be selected (other than those already selected) by traversing the title from left to right until the selected segments collectively include a number of tokens that exceeds the threshold (e.g., the selected segments include 12 or more tokens). The selection protocol may specify that the last selected segment that caused the threshold to be exceeded is to be deselected. In some embodiments, the selection protocol may specify that the selected segments are to be ordered according to an order of the original title and returned (or a shortened title is to be generated by concatenating the selected segments and returned).

It should be appreciated that the selection protocols discussed above are intended to be illustrative in nature and that selection protocols may vary in content. Additionally, any suitable selection protocol may include a default selection protocol that is to be utilized to attempt segment selection (or shortened title generation) should return of a set of selected segments (or shortened title generation) fail according to the current selection protocol.

At 318, the adaptive feedback engine 102 may generate output by selecting a subset of the segments 308 based at least in part on the selection protocol corresponding to the contextual intent of the user input identified at 314. In some examples, the adaptive feedback engine 102 may generate a shortened title comprising the selected segments as part of a response provided at a user device (e.g., the user device 112 of FIG. 1) to the previously provided user input.

In some embodiments, similar to the evaluation procedure 212 of FIG. 2, an evaluation procedure may be executed utilizing the output generated at 318. By way of example, this evaluation procedure may include providing any suitable portion of the output generated at 318 to one or more users of a crowdsourcing platform. One or more users of the crowdsourcing platform may rank and/or score the quality of the output generated using the segments selected or otherwise indicate whether the output provided (e.g., a short title) was acceptable or unacceptable. If the output is deemed unacceptable the user providing the evaluation may be provided the ability (e.g., via a user interface of the crowdsourcing platform) to provide one or more reasons why the output was deemed unacceptable (e.g., missing product type, missing brand, incomplete title, unnecessary information, other, etc.). The feedback provided/collected through the evaluation of the output generated at 318 may be utilized to update (e.g., retrain) the segmentation model 106 at any suitable time.

It should be appreciated that, in some embodiments, a machine-learning model (referred to as a segment selection model) that is different from the segmentation model 301 may be utilized to generate a shortened title from any set one of the segments 302 (e.g., the segments 308). The segment selection model (not depicted) may be trained and/or maintained utilizing any suitable machine-learning techniques (e.g., supervised learning, unsupervised learning, semi-supervised learning techniques). In some embodiments, the segment selection model may be trained based on a training data set including any suitable number of titles for which optimal shortened titles are already identified. In some embodiments, a contextual intent may be associated with the shortened title and the segment selection model may be trained to identify a shortened title from an input title (via segment selection) utilizing additional input such as the contextual intent related to the request for a shortened title. Accordingly, the output generated at 318 may utilize the shortened title provided as output from the segment selection model.

Figure 4:
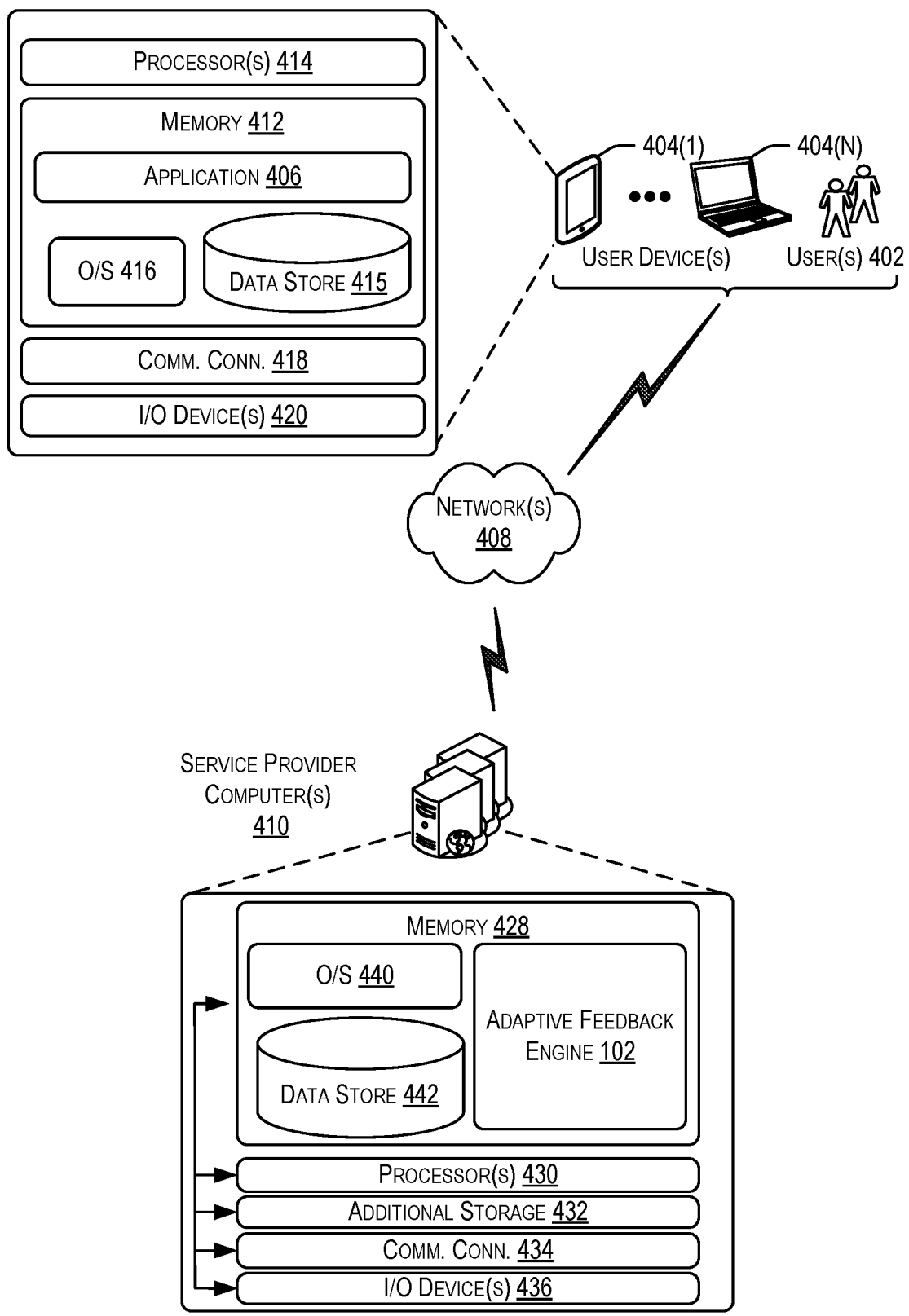
FIG. 4 illustrates example components of an adaptive feedback system according to a particular embodiment.

FIG. 4 illustrates components of an adaptive feedback system 400 according to a particular embodiment. In adaptive feedback system 400, one or more user(s) 402 may utilize a user device (e.g., a user device of a collection of user device(s) 404 to provide input to the service provider computer(s) 410. For example, the user may access any suitable input/output devices (e.g., I/O devices 420 discussed below) such as a keyboard, a microphone, and the like, to provide input (e.g., via an application 406 running on the user device(s) 404) to service provider computer(s) 410 via one or more network(s) 408. In some embodiments, the input may be audible (e.g., vocally provided by the user and received via a speaker of the user device). In some embodiments, the user device(s) 404 may be configured with any suitable speech synthesis algorithm (e.g., a text-to-speech algorithm) and/or speech recognition algorithms to convert textual data to audible output and/or to convert audible input to text. In some aspects, the application 406 operating on the user device(s) 404 may be hosted, managed, and/or provided by a computing service or service provider, such as by utilizing one or more service provider computer(s) 410.

In some examples, the network(s) 408 may include any one or a combination of many different types of networks, such as cable networks, the Internet, wireless networks, cellular networks, and other private and/or public networks. While the illustrated example represents the user(s) 402 accessing application functionality over the network(s) 408, the described techniques may equally apply in instances where the user(s) 402 interact with the service provider computer(s) 410 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the adaptive feedback engine 402 (e.g., an example of the adaptive feedback engines of FIGS. 1-3), discussed further below in more detail, may operate in whole or in part on the user device(s) 404. Thus, in some embodiments, the user(s) 402 may access the functionality of the adaptive feedback engine 402 directly through the user device(s) 404 and/or the service provider computer(s) 410 via user interfaces provided by the adaptive feedback engine 402. In some embodiments, the functionality of the adaptive feedback engine 402 may be provided as a software service with which input (e.g., text such as an item title) may be submitted and output may be received (e.g., one or more shortened versions of the item title). For example, the adaptive feedback engine 402 may operate as part of an intelligent personal assistant service provided by the service provider computer(s) 410 which can be accessed by vocal commands provided at the user device(s) 404.

In some embodiments, the application 406 may allow the user(s) 402 to interact with the service provider computer(s) 410 so as to provide the various functionality described above with respect to the adaptive feedback engine 402. For example, the application 406 may be utilized to convert and/or provide user input to the service provider computer(s) 410. In some embodiments, the application 406 may convert user input comprising sound data (e.g., audio input provided via a microphone of the user device(s) 404) to textual data utilizing any suitable language recognition techniques (e.g., speech-to-text algorithms that take audio content and transcribe it to written works/textual data). The application 406 may be configured to transmit (electronically convey) the user's input(s) to the adaptive feedback engine 402, operating at the user device(s) 402 and/or the service provider computer(s) 410. The application 406 may further be configured to receive, process, and/or present (via a speaker of the user device(s) 404 or another suitable output device) any suitable data received from the service provider computer(s) 410 (e.g., data containing a shortened title of an item determined to be related to the user input). In some embodiments, the application 406 may receive this data from the service provider computer(s) 410 in textual format. If so, the application 406 may convert the data from text to audio output (e.g., speech) utilizing any suitable speech synthesis algorithm (e.g., a text-to-speech algorithm that enables text to be rendered as linguistic representations using, for example, a data base of prerecorded speech files).

The service provider computer(s) 410, perhaps arranged in a cluster of servers or as a server farm, may host the application 406 operating on the user device(s) 404 and/or cloud-based software services. Other server architectures may also be used to host the application 406 and/or cloud-based software services. The application 406 operating on the user device(s) 404 may be capable of handling requests from the user(s) 402 and serving, in response, various user interfaces and/or output (e.g., textual output, audio output) that can be presented at the user device(s) 404 (e.g., via a display and/or speaker). The application 406 operating on the user device(s) 404 can present any suitable type of website that supports user interaction, including search engine sites, item detail pages, and the like. The described techniques can similarly be implemented outside of the application 406, such as with other applications running on the user device(s) 404.

The user device(s) 404 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 may be in communication with the service provider computer(s) 410 via the network(s) 408, or via other network connections.

In one illustrative configuration, the user device(s) 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user computing device, the memory 412 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system 416, one or more data stores 415, and one or more application programs, modules, or services for implementing the features of the adaptive feedback engine 402 disclosed herein, provided via the application 406 (e.g., a browser application, a shopping application, a digital assistant application, etc.). The application 406 may be configured to receive, store, and/or display a network page or other interface for interacting with the service provider computer(s) 410. In some embodiments, the application 406 may be configured to present user options and/or receive user input audibly. In some embodiments, the memory 412 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device or server (e.g., the service provider computer(s) 410), user terminals and/or other devices on the network(s) 408. The user device(s) 404 may also include I/O device(s) 420, such as a keyboard, a mouse, a pen, a voice input device (e.g., a microphone), a touch input device, a display, speakers, a printer, etc.

In some aspects, the service provider computer(s) 410 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 410 may be in communication with the user device(s) 404 and/or other service providers via the network(s) 408 or via other network connections. The service provider computer(s) 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 410, the memory 428 may be volatile (such as RAM) and/or non-volatile (such as ROM, flash memory, etc.). The service provider computer(s) 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device or server, user terminals and/or other devices on the network(s) 408. The service provider computer(s) 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein, such as the features provided by the adaptive feedback engine 402.

Figure 5:
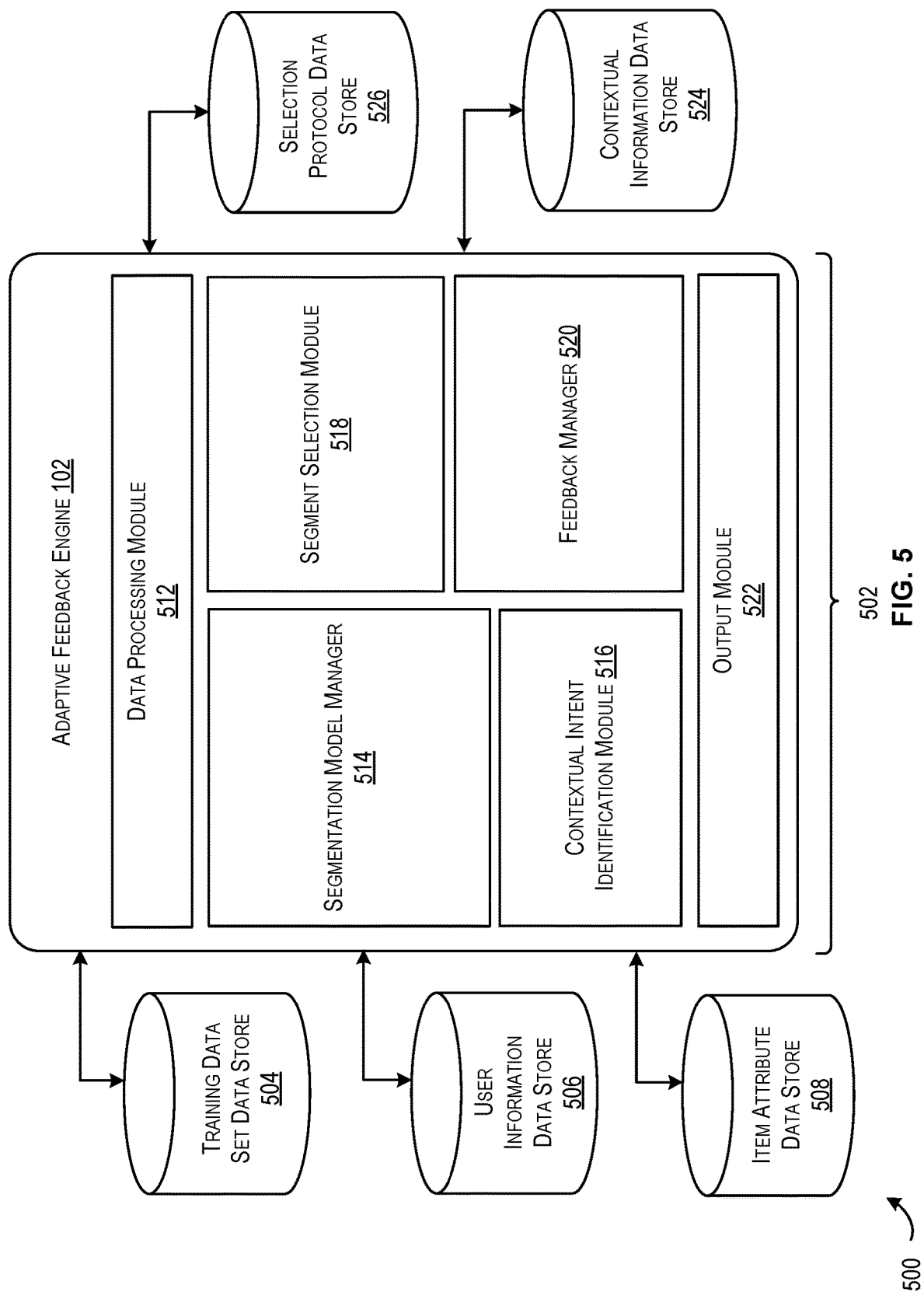
FIG. 5 is a schematic diagram of an example computer architecture for the adaptive feedback engine, including a plurality of modules that may perform functions in accordance with at least one embodiment.

FIG. 5 is a schematic diagram of an example computer architecture 500 for the adaptive feedback engine 501 (e.g., an example of the adaptive feedback engines of FIGS. 1, 2, and 4), including a plurality of modules 502 that may perform functions in accordance with at least one embodiment. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502, or some portion of the modules 502, may be operate at the service provider computer(s) 410 of FIG. 4, or the modules may operate as separate modules or services external to the service provider computer(s) 410 (e.g., as part of the application 406 of FIG. 4 operating on the user device(s) 404 of FIG. 4).

In the embodiment shown in the FIG. 5, a training data set store 504, a user information data store 506, an item attribute data store 508, a selection protocol data store 526, and a contextual information data store 524 are shown, although data can be maintained, derived, or otherwise accessed from various data stores, either remote or local to the adaptive feedback engine 501, to achieve the functions described herein. In at least one embodiment, the data stores described herein may be physically located on the user device(s) 404 or alternatively, any suitable combination of the data stores may be operated as part of the service provider computer(s) 410, for example, as part of the adaptive feedback engine 501. The adaptive feedback engine 501, as shown in FIG. 5, includes various modules such as a data processing module 512, a segmentation model manager 514, a contextual intent identification module 516, a segment selection module 518, a feedback manager 520, and an output manager 522 are shown. Some functions of the modules 502 are described below. However, for the benefit of the reader, a brief, non-limiting description of each of the modules is provided in the following paragraphs. In accordance with at least one embodiment, a process is identifying potential feature combinations for a new item.

In at least one embodiment, the adaptive feedback engine 501 includes the data processing module 512. Generally, the data processing module 512 may be utilized to receive any suitable information with respect to any example provided herein. The data processing module 512 may include any suitable number of application programming interfaces with which the functionality of the adaptive feedback engine 501 may be invoked. In some embodiments, the data processing module 512 may be configured to receive potential training set data (e.g., training data set 204 of FIG. 2, a set of one or more titles for which segments and/or attribute categories for at least some of the segments have already been identified for a the titles of the set). The data processing module 512 may be configured to store the potential training data in training data set data store 504.

The adaptive feedback engine 501 may include a segmentation model manager 514. The functionality of the segmentation model manager 514 may be invoked by the data processing module 512. By way of example, upon receiving potential training data, the data processing module 512 may invoke (e.g., execute a function call to invoke) the functionality of segmentation model manager 514.

In some embodiments, the segmentation model manager 514 may be configured to train and/or maintain a segmentation model (e.g., the segmentation model 106 of FIG. 1, the segmentation model 201 of FIG. 2) to identify segments (e.g., strings of one or more tokens (words, numbers, strings of characters, etc.) from input data (e.g., an item title provided as input). To train the model, the segmentation model manager 514 may be configured to may obtain a training data set 204. In some embodiments a training data set (e.g., training data set 204 of FIG. 2) may be previously received by the data processing module 512 and stored in training data set data store 504, a data store configured to store such information. In other embodiments, the segmentation model manager 514 may obtain the training data set from, at least in part, soliciting feedback from a group of crowdsource users via a crowdsourcing platform.

In some embodiments, the training data set may include any suitable data with which segmentation model may be trained to identify one or more segments from input data (e.g., a title associated with an item). By way of example, the training data set may include any suitable number of titles and corresponding sets of segments previously identified (e.g., by crowdsource users, from a different manual classification process, etc.) within the titles. In some embodiments, the training data set may additionally include attributes labels associated with each segment of a title that indicate an association between the segment and an attribute category of an item. Attribute categories may include, but are not limited to, brand, size (e.g., size 4), pack size (e.g. pack of 60), specialty (e.g. sugar-free), length (e.g. 4 inches), weight (e.g. 60 pounds), volume (e.g. 100 gallons), capacity (e.g. 32 GB), dimension (e.g. 5 inch×10 inch), power (e.g. 25 Watt), model (e.g. C2SA-YS02), product condition (e.g., refurbished), or any suitable attribute category configured to describe a type of item attribute.

If training data is to be obtained from a crowdsourcing platform, the segmentation model manager 514 may invoke the functionality of the feedback manager 520. The feedback manager 520 may be configured to host and/interface with a crowdsourcing platform to obtain training data set information from any suitable number of users. In some embodiments, the feedback manager 520 may present via an interface it hosts, or provide to the crowdsourcing platform to present, a predetermined list of titles that may be presented to a group of crowdsource users to solicit feedback. The feedback (sometimes called "feedback data") may indicate manual identifications of the segments of each title and, in some cases, an attribute category with which the user believes the segment relates. The feedback may be processed by the crowdsourcing platform and/or the feedback manager 520 to identify when the same segment(s) identified from a title (e.g., a same segment including the same number of tokens/words that are in the same sequence) have been identified over a threshold number of times and/or by over a threshold percentage (e.g., over 50%, over 75%, etc.) of all users that have been presented that particular title. If so, that title and its identified segments may be added to the training data set stored in training data set data store 504. Similarly, the crowdsourcing platform (or feedback manager 520) can be configured to identify when the same attribute category (e.g., brand, product time, dimensions, etc.) have been assigned by crowdsource users over a threshold number of times and/or by over a threshold percentage (e.g., over 50%, over 75%, etc.) of all users that have been presented that particular title and/or those users that have assigned the segment an attribute category. If so, that attribute category may be included as attribute annotation data in the training data set and stored in the training data set data store 504.

It should be appreciated that the segmentation data (identifies segments of titles) and the attribute annotation data (identifying attribute categories for one or more segment(s)) for a given item (or item title) may be stored in separate containers or a common container. For example, a mapping, list, and/or object may be maintained for each title that further identifies a list of token indexes (e.g., word indexes) of the title that have been identified as a beginning token of a segment of one or more tokens, a list of one or more segments including one or more tokens, and a list of one or more attribute categories for one or more of the segments that identify to which one or more attribute categories each segment relates.

Returning to the segmentation model manager 514, the segmentation model manager 514 may be configured to train a segmentation model (e.g., the segmentation model 106 of FIG. 1, the segmentation model 201 of FIG. 2, etc.) using any suitable portion of the training data set. In some embodiments, the segmentation model manager 514 may be configured to filter one or more titles from the training data set prior to training the model. For example, titles in which the ratio of tokens that are identified (e.g., previously, by a crowdsourcing platform, etc.) as the beginning of a segment may be divided by the total number of tokens within the title. In some embodiments, if the resultant value does not meet or exceed a threshold value (e.g., over 0.15 to indicate that over 15% of the tokens open a segment), the segmentation model manager 514 may be configured to filter the title (or otherwise not include the title) in the training data set. As another example, the segmentation model manager 514 may be configured to filter and suitable segmentation data and/or attribute annotation data from the training data set for titles that include a number of tokens that does not fall in a predetermined number range (e.g., 5-15 tokens, 6-14 tokens, etc.). By utilizing these filtering techniques, the segmentation model manager 514 may improve the quality of training data set to ensure titles having an optimal token length and having an optimal ratio of segments for training purposes.

The segmentation model manager 514 may train the segmentation model utilizing any suitable machine-learning technique. For example, the segmentation model manager 514 may utilize a supervised machine-learning technique. A supervised machine-learning technique is intended to refer to any suitable machine-learning algorithm that maps an input to an output based on example input-output pairs. A supervised learning algorithm (e.g., decision trees, artificial neural networks, distance functions such as nearest neighbor functions, regression analysis, etc.) may analyze the training data and produce an inferred function (also referred to as "a model"), which can be used identifying an output (e.g., one or more segments, one or more attributes for a segment, etc.) for a subsequent input (e.g., an item title). Accordingly, by executing the supervised learning algorithm on the training data set, the segmentation model may be trained by the segmentation model manager 514 to identify one or more segments (and attribute categories for those segments) from subsequent input data (e.g., subsequently provided item titles).

Item titles may often be structured differently than ordinary sentences (e.g., sentences). For example, item titles may often include a sequence of noun phrases without any verbs. Additionally, item titles may often utilize punctuation marks and/or symbols differently than typically used in a sentence. In some embodiments, the supervised learning algorithm may utilize punctuation marks and/or symbols found in the input data, a list of predetermined tokens that typically identify the beginning and/or some portion of a segment (or that indicate a relation to an attribute category), a list of predetermined regular expressions that typically identify the beginning and/or some portion of a segment (or that indicate a relation to an attribute category) to generate a function (e.g., the model) to identify segments (and in some cases, attribute categories) from input data.

In some embodiments, the segmentation model may be a feed forward artificial neural network with one hidden layer atop of a trainable embedding layer. A feed forward neural network may be an artificial neural network wherein connections between the nodes in the neural network do not form a cycle. In this type of neural network, the information moves in only one direction, forward, from node to node. In some embodiments, the segmentation model may identify a subset of the input data (e.g., at most 5 tokens in the order in which they appear in the title). The segmentation model may evaluate the tokens to identify whether a center token opens a segment or not. In some embodiments, the subset of input data may change according to a sliding window. For example, a 5 token window may be utilized, although other window sizes are contemplated. A first evaluation may include 2 special symbols in the first and second positions of the window, followed by the first token in the title, the second token in the title, and a third token in the title, respectively. A second evaluation may occur for the second token in the title using a window including a symbol denoting a padded value, the first token in the title, followed by the second, third, and fourth tokes of the title, respectively. The window may be moved at each evaluation until all tokens in the title have been evaluated. The last evaluation may be of token 5 and the window may include token 3, token 4, token 5, following by two special symbols indicating padded values. In this manner, each token (e.g., word) of the input data may be evaluated and labeled according to at least some of the surrounding tokens (e.g., some tokens that precede the token in the title and/or some tokens that subsequently occur in the title).

Once trained, or at any suitable time, any suitable number of titles from the training data set may be provided to the segmentation model and a number of segments for the title may be identified (and in some cases one or more attribute categories for at least some of the respective segments). These segments (and/or attribute categories) may be utilized for an evaluation procedure (e.g., the evaluation procedure 212 of FIG. 2) to evaluate the quality of the segmentation model with respect to accuracy of the segment(s) identified from the title and/or the accuracy of the attribute category identified for each segment.

In some embodiments, the evaluation procedure may occur at any suitable time as new training data is generated. By way of example, as the segmentation model identifies subsequent segments and/or attribute categories of a title, this new data may be stored by the segmentation model manager 514 in the training data set data store 504 and filtered as described above to form an updated version of the training data set. Periodically and/or according to a schedule, the segmentation model manager 514 may be configured to retrain the segmentation model utilizing the updated version of the training data.

Part of the evaluation procedure 212 may include querying one or more crowdsourcing platform users to identify whether a set of segments and/or an attribute category for a given title have been accurately identified. In some embodiments, segmentation model manager 514 may stimulate this process by invoking the functionality of the feedback manager 520 and/or the feedback manager 520 may be configured to perform these operations according to any suitable periodicity, frequency, and/or schedule. The feedback manager 520 may provide any suitable interface (and/or provide any suitable data to the crowdsourcing platform) to solicit feedback from the crowdsourcing platform users. In some embodiments, the feedback may indicate one or more reasons the segmentation and/or attribute category was inaccurate. This feedback may be utilized to retrain the segmentation model to more accurately identify input data going forward.

It should be appreciated that the operations performed to train the segmentation model may be performed as part of a preprocessing procedure, or at least prior to utilizing the segmentation model to identify output for a response to received user input.

In some embodiments, the data processing module 512 may be configured to receive input data (e.g., user input data 110 of FIG. 1) may be obtained at a user device (e.g., the user device 112, the user device(s) 404 of FIG. 4). As a non-limiting example, a user of the user device may speak a command/statement/question which can be can be received as sound input by an input device (e.g., a microphone) of the user device. Although sound data/vocal input are used in a variety of examples herein, it should be appreciated that similar techniques may be utilized using data of other formats (e.g., textual data) via the user submitting the input data via another suitable input device (e.g., a keyboard). In some embodiments, the data processing module 512 may convert the input data to text at any suitable time utilizing any suitable speech-to-text algorithm.

In some embodiments, the data processing module 512 may invoke the functionality provided by the contextual intent identification module 516. The contextual intent identification module 516 may be configured to identify a contextual intent for the input data received from the data processing module 512. For example, the input data may include content indicative of an attempt to purchase an item, a task which may be associated with a buy intent (a type of contextual intent). To identify the contextual intent of the input data, the contextual intent identification module 516 may tokenize to separate the input data into tokens (words, numbers, and/or phrases). The contextual intent identification module 516 may be configured to utilize any suitable lexical analysis algorithm to identify these tokens. In some embodiments, a contextual protocol set (e.g., one or more predetermined rules) may be utilized to determine the contextual intent of the input data based at least in part on these tokens (e.g., words) and/or combinations of tokens (e.g., phrases). By way of example, the contextual protocol set (or contextual protocol for brevity) may specify particular words, phrases, regular expressions and the like as being associated with (e.g., mapped) to a particular contextual intent (e.g., a buy intent, a cancel order intent, a reorder intent, etc.). The contextual intent identification module 516 may identify input data as having a particular type of contextual intent when the input data includes over a threshold number of words/phrases/regular expressions associated with the particular type of contextual intent (or at least more than it contains of words/phrases/regular expressions associated with one or more other contextual intents). The contextual intent identification module 516 may be configured to store any suitable data related to the input data such as the input data itself and the contextual intent identified for the input data in the contextual information data store 524. Any functionality performed by the contextual intent identification module 516 may be specified and driven by one or more predetermined contextual intent protocols (e.g., rules) that may be stored in the contextual information data store 524 and accessible to the contextual intent identification module 516. Thus, the functionality described above as being performed by the contextual intent identification module 516 may be performed in accordance with the contextual intent protocol(s) obtained from the contextual information data store 524.

In some embodiments, the data processing module 512 may identify an item based at least in part on some portion of the input data and item attribute information stored in item attribute data store 508. Item attribute data store 508 may contain attributes associated with any suitable number of items (e.g., items offered in an electronic catalog). By way of example, the data processing module 512 may generate a query (e.g., query 120 derived from user input data 110 of FIG. 1) and utilize the query (and any suitable search engine technique) to identify one or more items corresponding to the query. In some embodiments, the searching technique for identifying the one or more items corresponding to the query may utilize any suitable portion of the data stored in the item attribute data store 508 and/or any suitable information (e.g., historical purchase history, browsing history, reoccurring orders/subscriptions) stored in the user information data store 506 and associated (e.g., via a user account) with the user and/or a group of users of the electronic catalog. Upon identifying an item, the data processing module 512 may obtain a particular attribute of the item, such as the item title and may submit the item title to the segmentation model manager 514 (or to the segmentation model directly if stored in a storage location accessible to the data processing module 512) to identify one or more segments of the item title (and, in some cases, one or more attribute categories for at least some of the respective segments). In some embodiments, the data processing module 512 may store any suitable attribute of the item (e.g., the title), one or more tokens and/or token indexes (identified by the segmentation model manager 514), one or more segments identified by the segmentation model manager 514, one or more attribute categories associated with a given segment, the input data to which the item relates, the contextual intent identified for the input data by the contextual intent identification module 516, or the like. In some embodiments, this information may be stored in the contextual information data store 524.

In some embodiments, the segment selection module 518 may be configured to select one or more segments from the segment(s) identified by the model based on the contextual intent of the input data. In some embodiments, the segment selection module 518 may maintain a mapping that identifies associations between a particular contextual intent and a particular type of shortened title. Each type of shortened title may be associated with a corresponding set of rules (e.g., a subset of rules of a selection protocol) that specifies the manner in which particular segments are to be selected (e.g., and/or to generate a shortened title) from the one or more segments identified at 122. A number of example selection protocol are discussed above in connections with FIG. 3. In some embodiments, the adaptive feedback engine may generate a shortened title from the selected segment(s) and in accordance with one or more rules of the selection protocol (e.g., particular segments related to particular item features are to be selected and arranged in a particular order, etc.). Any suitable number of selection protocols may be stored within the selection protocol data store and accessible to the segment selection module 518.

The segment selection module 518 may be configured to obtain a segment selection protocol from the selection protocol data store 526. A segment selection protocol (also referred to as a "selection protocol set" or "segment selection protocol") may identify a set of rules for segment selection. In some embodiments, the segment selection module 518 may consult a predefined mapping (e.g., stored in the selection protocol data store 526) that maps contextual intents (e.g., buy intent, reorder intent, cancel intent, etc.) to an identifier for the segment selection rules to be utilized for segment selection (e.g., "long title rules," "short title rules," "medium title rules," etc.). There can be any suitable number of segment selection rules corresponding to any suitable number of contextual intents that may be used for segment selection.

By way of example, the mapping may indicate that input data identified as having the contextual intent to buy an item (e.g., buy intent) is to utilize segment selection rules (e.g., rules corresponding to selecting segment based on generating a long title, a first set of segment selection rules, etc.), while input data that is identified as having a different contextual intent (e.g., reorder intent, cancel intent, etc.) is to utilize another set of segment selection rules (e.g., a set of rules that differ from the first set of segment selection rules above, a set of rules for segment selection for generating a medium title, or yet another set of rules for segment selection to be used for generating a short title, etc.). It should be appreciated that terms "long," "short," and "medium" discussed with respect to an item title may refer to a particular title length (e.g., as measured in words, terms, tokens, segments, etc.) and/or the terms "long," "short," and "medium," among others, may refer to the selection protocol to be utilized. Several example segment selection protocols are provided above in connection with FIG. 3. In some embodiments, the segment selection module 518 may be configured to execute a particular segment selection protocol on input data to select one or more segments of the input data and/or receive a shortened version comprising one or more segments. In some embodiments, the segment selection module 518 may be configured to generate a shortened title from the one or more segments selected utilizing the title and the segment selection protocol. In some embodiments, the segment selection module 518 may be configured to execute a default segment selection protocol should executing a first segment selection protocol fail to provide a set of selected segments and/or shortened title. In some embodiments, an indication of the selected segments of an instance of input data (and/or a shortened title generated from those selected segments) may be stored in any suitable storage location (e.g., as part of the data stored in the training data set data store 504, as part of the data stored in the contextual information data store 524).

The selected segments may be provided by the segment selection module 518 to the output manager 522, or the output manager 522 may retrieve this data from the storage location in which that data resides. The output manager 522 may be configured to generate output corresponding to the input data based at least in part on the content of the input data and any suitable data identified by any suitable combination of the modules 502. In some embodiments, the output manager 522 may utilize one or more of the selected segments to generate the output. The particular output generated may be based on a number of predefined rules. In some embodiments, these rules may cause the output to utilize all or some portion of the segments identified for the item corresponding to the input data to be utilized in the output. In some embodiments, these rules may identify which segments are to be utilized by specifying an attribute category (e.g., segments associated with brand, segments associated with product type, etc.). In some embodiments, the segments may be utilized in the sequence originally provided by the input data or the output manager 522 may rearrange the segments according to the output generation rules. In some embodiments, the output manager 522 may be configured to convert the output to audio output utilizing any suitable text-to-speech algorithm discussed herein. The audio output (and/or the textual version of the output) may be presented (e.g., by the adaptive feedback engine 501) at a user device via an application hosted by the adaptive feedback engine 501 (e.g., the application 406 of FIG. 4).

In some embodiments, the segment selection module 518 may be configured to train and/or maintain a segment selection model that is separate from the segmentation module maintained by the segmentation model manager 514. In some embodiments, the segment selection model may be trained to identify shortened titles from input titles (e.g., utilizing any suitable supervised, unsupervised, and/or semi-supervised learning techniques). In some embodiments, this machine-learning model may be trained based on a training data set including any suitable number of titles for which optimal shortened titles are already identified. In some embodiments, a contextual intent may be associated with the shortened title and the machine-learning model may be trained to identify a shortened title from an input title utilizing additional input such as the contextual intent related to the request for a shortened title. Accordingly, the segment selection module 518 may utilize the segment selection model to generate a shortened title from segments and a contextual intent provided as input. In some embodiments, the segment selection model may be stored and subsequently obtained in the selection protocol data store 526.

In some embodiments, similar to the evaluation procedure 212 of FIG. 2, an evaluation procedure may be executed by the feedback manager 520 utilizing the output generated by the output manager 522. By way of example, this evaluation procedure may include providing any suitable portion of the output to one or more users of a crowdsourcing platform (or via one or more interfaces provided by the feedback manager 520). These users may rank and/or score the quality of the output by indicating whether the output provided (e.g., a short title) was acceptable or unacceptable. If the output is deemed unacceptable the user may be provided the ability (e.g., via a user interface of the crowdsourcing platform or feedback manager 520) to provide one or more reasons why the output was deemed unacceptable (e.g., missing product type, missing brand, incomplete title, unnecessary information, other, etc.). The feedback provided/collected through the evaluation of the output may be utilized to update (e.g., retrain) the segmentation model 106 and/or to update the segment selection protocol set at any suitable time.

As a simplistic example, if the output was deemed unacceptable because over a threshold number of users identified it as missing a product type, that information may be utilized (e.g., by the feedback manager 520) to update the segment selection rules utilized to identify the segments used in the output to indicate (or elevate) a preference for selection of a segment of that attribute category.

It should be appreciated that although examples provided herein utilize a user request as a triggering event to execute the functionality of the adaptive feedback engine 501, such functionality may be triggered using different means. By way of example, the functionality of the adaptive feedback engine 501 (and/or the modules 502) may be provided as a software service assessable via one or more application programming interfaces and/or function calls. Accordingly, it may be the case that a user request may be considered to be information received via an application programming interface and/or function call. By way of example, any suitable system may request a shortened title for an item. In some embodiments, the request may specify a selection protocol and/or a type of shortened title requested (e.g., "long," "short," "medium"). In some embodiments, the request may further include one or more default selection protocols or types of shortened titles requested should the first selection protocol fail to produce a shortened title. Accordingly, in some examples, contextual intent of the request need not be ascertained as the intent (e.g., requesting a title according to a particular selection protocol/order of protocols) has already been specified in the request.

As a non-limiting example, a system or process responsible for notifying a user of information (e.g., delivery notification) may request a shortened title for one or more items (e.g., items to be referenced in the deliver notification) . For example, the title of an item may include "Coffee, 2 lbs. bag, whole beans, $12.99." The system may request a shortened title by providing the title or an identifier of the item with which the item attributes (e.g., the item title) may be retrieved. The requestor may further include an indicator indicating a request for a shortened title of a particular type (e.g., a "short title"). The item title may be utilized by the segment selection module 518 to select a number of segments according to a selection protocol associated with the type of shortened title requested. If a shortened title is obtained using the selection protocol, the shortened title may be returned to the requesting system, enabling that system to provide the user a notification indicating "your coffee has arrived" when it detects the delivery of a package associated with the item has been delivered.

It should also be appreciated that in the examples provided above a single item may be utilized. However, it should be appreciated that a request (e.g., from a user, from another system or computing device, etc.) may relate to multiple items and the adaptive feedback engine 501 may be utilized to generate shortened titles for each item in the manner discussed herein. As a non-limiting example, a user may ask "what are the deals today?" A query may be generated from that request and a number of items associated with discounted prices may be returned. In some embodiments, the request may be identified as being associated with a "deals intent." Accordingly, a shortened title may be generated for each item using a particular selection protocol for each title. Thus, the user may be presented with output such as "today's deals include Bluetooth Headphones, Brand X Coffee, a headlamp, and more."

Thus, by utilizing the techniques discussed herein, the user's experience is improved by tailoring the output to provide enough information to be informative and to provide clarity, without inundating the user with superfluous information that may confused or annoy the user or cause confusion as to the meaning of the output provided to the user.

Figure 6:
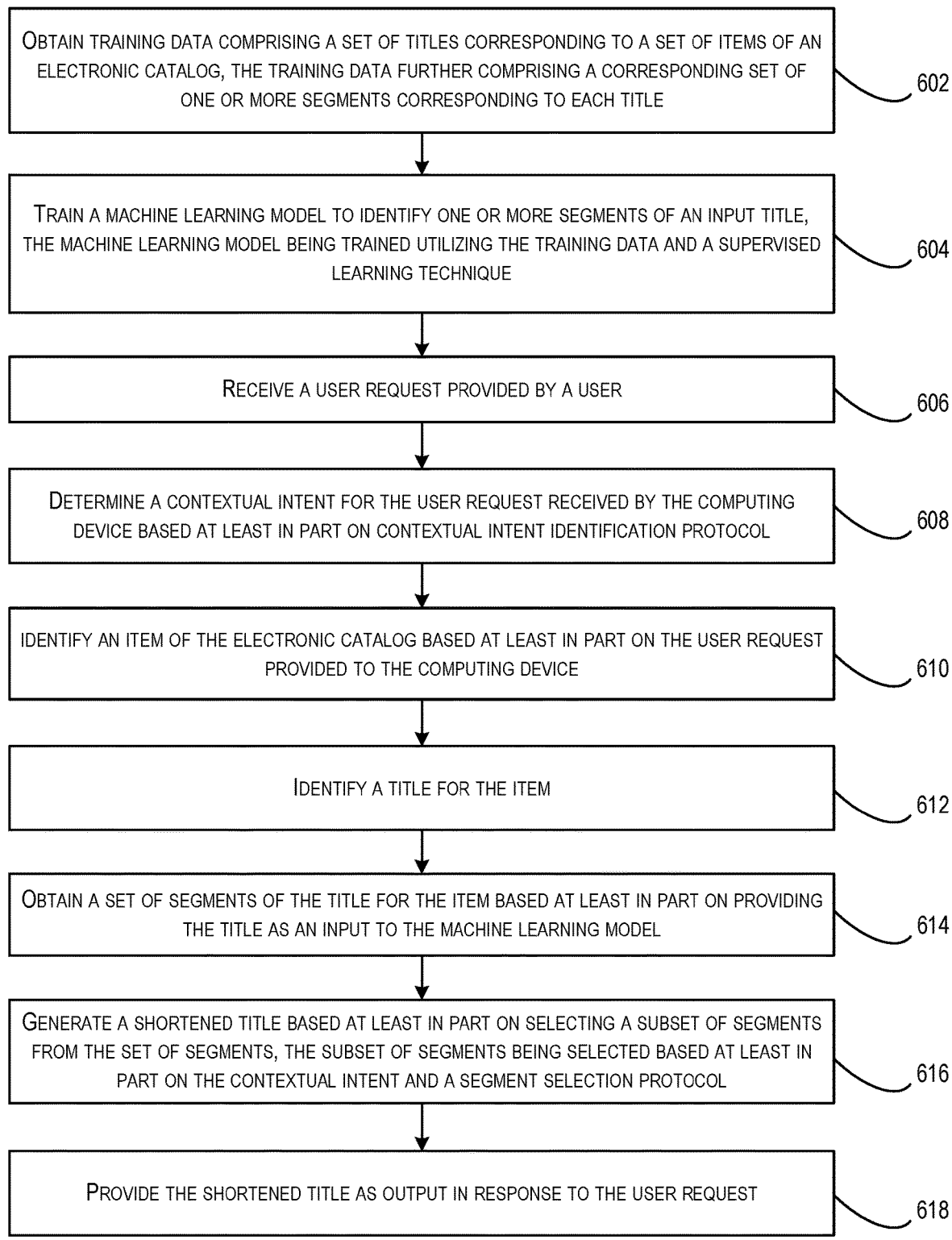
FIG. 6 is a flowchart illustrating an example method for generating a shortened title for an item utilizing an adaptive feedback engine, in accordance with at least one embodiment.

FIG. 6 is a flowchart illustrating an example method 600 for generating a shortened title for an item utilizing an adaptive feedback engine (e.g., the adaptive feedback engines of FIGS. 1-5), in accordance with at least one embodiment. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by any suitable combination of the modules 502 of the adaptive feedback engine 501 of FIG. 5 which may operate in whole or in part on a user device (e.g., one or more of the user device(s) 404 of FIG. 4) and/or the service provider computer(s) 410 of FIG. 4.

The method 600 may begin at 602, where training data may be obtained (e.g., by the segmentation model manager 514, by the feedback manager 520 of FIG. 5, etc.). The training data may comprise a set of titles corresponding to a set of items of an electronic catalog. In some embodiments, the training may further comprising a corresponding set of one or more segments corresponding to each title. In still further embodiments, the training data may further comprise a number of attribute categories corresponding to one or more of the one or more segments.

At 604, the computing system (e.g., the segmentation model manager 514) may train a machine-learning model (e.g., a feed forward artificial neural network) to identify one or more segments of an input title. In some embodiments, the machine-learning model may be trained utilizing the training data and a supervised learning technique.

At 606, a user request (e.g., user input data 110 of FIG. 1) may be provided by a user and received by the computing system. As a non-limiting example, the user may speak and his spoken words may be received by a user device, converted to text (e.g., by the application 406 of FIG. 4 utilizing any suitable speech-to-text software algorithm) and transmitted to the adaptive feedback engine 501. In some embodiments, the data processing module 512 of the adaptive feedback engine 501 may be configured to perform this conversion.

At 608, the computing system (e.g., the contextual intent identification module 516) may determine a contextual intent for the user request received by the computing device based at least in part on contextual intent identification protocol (as stored in the contextual information data store 524 of FIG. 5). In some embodiments, the contextual intent identification protocol may identify a set of predetermined words, phrases, and/or regular expressions as being indicative of a particular contextual intent. Accordingly, if the contextual intent identification module 516 identifies the user request includes one or more of these words/phrases/ regular expressions, the user request may be determined to have a contextual intent corresponding to the contextual intent associated with those words/phrases/regular expressions.

At 610, the computing system (e.g., the data processing module 512) may identify an item of the electronic catalog based at least in part on the user request provided to the computing device. By way of example, a query may be derived from the user request (e.g., text representing the user's spoken words) and utilized with any suitable search engine algorithm to identify one or more items to which the query relates.

At 612, the computing system may identify (e.g., with the data processing module 512) a title for the item. By way of example, a title for the item (e.g., an attribute of the item as stored in the electronic catalog) may be retrieved (e.g., from attributes stored in the item attribute data store 508).

At 614, the computing system (e.g., the segmentation model manager 514) may obtain a set of segments of the title for the item based at least in part on providing the title as an input to the machine-learning model.

At 616, the computing system (e.g., the output manager 522 of FIG. 5) may generate a shortened title based at least in part on a subset of segments selected (e.g., by the segment selection module 518) from the set of segments. In some embodiments, the subset of segments may be selected based at least in part on the contextual intent and a segment selection protocol.

At 618, the shortened title may be provided (e.g., by the output manager 522, by the application 406 of FIG. 4) as output in response to the user request. The output may be provided at the user device from which the user request was initially submitted. In some embodiments, the output may be converted to audio output by the output manager 522 or the user device and presented at a speaker of the user device.

Figure 7:
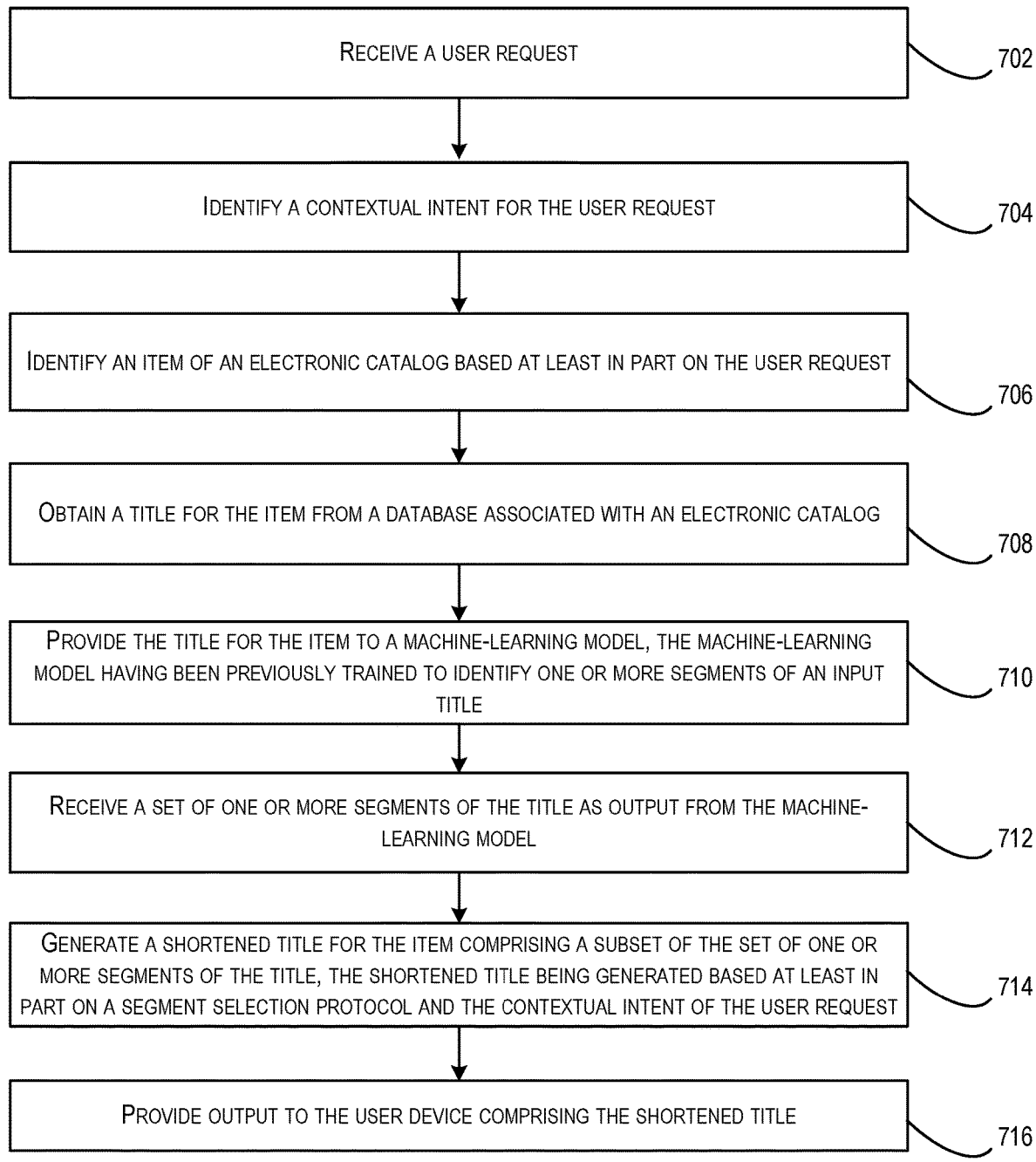
FIG. 7 is another flowchart illustrating another example method for generating a shortened title for an item utilizing an adaptive feedback engine, in accordance with at least one embodiment.

FIG. 7 is another flowchart illustrating another example method 700 for generating a shortened title for an item utilizing an adaptive feedback engine (e.g., the adaptive feedback engines of FIGS. 1-5), in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 502 of the adaptive feedback engine 501 of FIG. 5 which may operate in whole or in part on a user device (e.g., one or more of the user device(s) 404 of FIG. 4) and/or the service provider computer(s) 410 of FIG. 4. As a non-limiting example, the method 700 may be performed by a computing device (e.g., the service provider computer(s) 410) having one or more processors and a memory storing executable instructions that, upon execution by the one or more processors, cause the user device to perform the operations of method 700.

The method 700 may begin at 702, where a user request may be received from a user device. In some embodiments, the user request (e.g., user input data 110 of FIG. 1) may be received by the data processing module 512 of FIG. 5. In some embodiments, the user request may be received as text or speech. If the user request is received as speech, the data processing module 512 may be configured to convert the speech to text utilizing any suitable speech to text algorithm.

At 704, a contextual intent for the user request may be identified (e.g., by the contextual intent identification module 516). In some examples, identifying a contextual intent for a user request may utilize a contextual intent identification protocol. The contextual intent identification protocol may identify a set of predetermined words, phrases, and/or regular expressions as being indicative of a particular contextual intent. Accordingly, if the contextual intent identification module 516 identifies the user request includes one or more of these words/phrases/regular expressions, the user request may be determined to have a contextual intent corresponding to the contextual intent associated with those words/phrases/regular expressions.

At 706, an item of an electronic catalog may be identified (e.g., by the data processing module 512) based at least in part on the user request. In some embodiments, the item may be identified from item information stored in the item attribute data store 508 and corresponding to the items provided in the electronic catalog.

At 708, a title for the item may be identified (e.g., from a database associated with the electronic catalog such as the item attribute data store 508). For example, a title may be retrieved from an attribute associated with the item.

At 710, the title for the item may be provided (e.g., by the segmentation model manager 514) to a machine-learning model (e.g., the segmentation model 106 of FIG. 1, the segmentation model 201 of FIG. 2, etc.). In some embodiments, the machine-learning model may have been previously trained to identify segments of an input title.

At 712, a set of one or more segments of the title may be received (e.g., by the segment selection module 518) as output from the machine-learning model.

At 714, a shortened title f may be generated (e.g., by the output manager 522 of FIG. 5) for the item. In some embodiments, the shortened title may be generated based at least in part on segment selection protocol (e.g., a protocol that specifies how a subset of segments are to be selected for inclusion in a shortened title) and the contextual intent of the user request. In some embodiments, the output manager 522 may generate the shortened title from segments identified using the segment selection protocol and the contextual intent.

At 716, the shortened title may be provided (e.g., via the output manager 522) as audio output at a speaker of the user device. In some embodiments, the output manager 522 and/or the user device presenting the audio output may generate the audio output from the shortened title by converting the shortened title from text to audio utilizing any suitable text-to-speech software algorithm.

Figure 8:
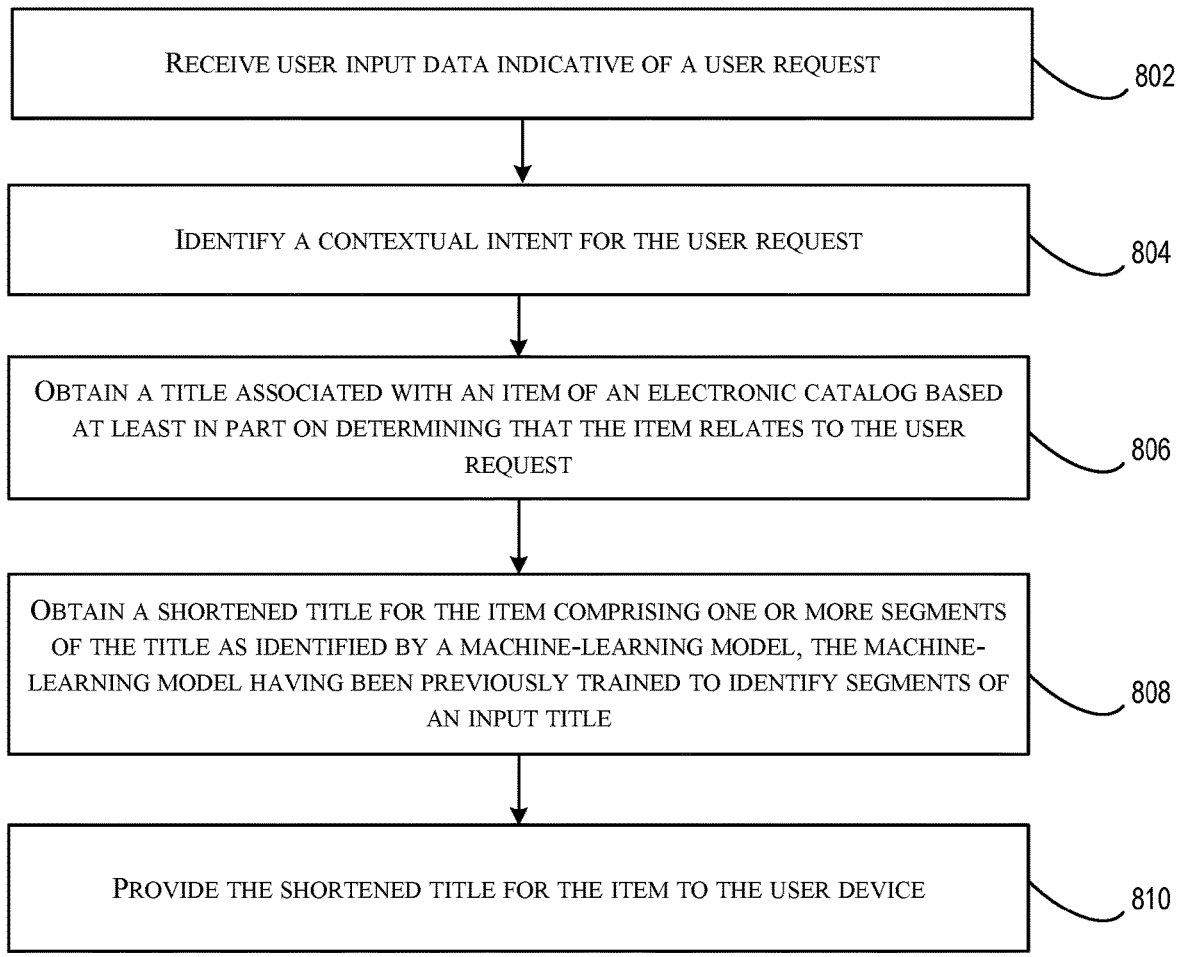
FIG. 8 is yet another flowchart illustrating yet another example method for generating a shortened title for an item utilizing an adaptive feedback engine, in accordance with at least one embodiment.

FIG. 8 is yet another flowchart illustrating yet another example method 800 for generating a shortened title for an item utilizing the adaptive feedback engine (e.g., the adaptive feedback engines of FIGS. 1-5), in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 502 of the adaptive feedback engine 501 which may operate in whole or in part on a user device (e.g., one or more of the user device(s) 404 of FIG. 4) and/or the service provider computer(s) 410 of FIG. 4.

The method 800 may begin at 802, where user input data (e.g., user input data 110) may be received. The input may be indicative of a user request (e.g., a request to purchase an item, a request to reorder an item, a request to search for an item, a request to cancel an order, etc.).

At 804, a contextual intent for the user request may be identified (e.g., by the contextual intent identification module 516). In some examples, identifying a contextual intent for a user request may utilize a contextual intent identification protocol. The contextual intent identification protocol may identify a set of predetermined words, phrases, and/or regular expressions as being indicative of a particular contextual intent. Accordingly, if the contextual intent identification module 516 identifies the user request includes one or more of these words/phrases/regular expressions, the user request may be determined to have a contextual intent corresponding to the contextual intent associated with those words/phrases/regular expressions.

At 806, a title associated with an item of an electronic catalog may be obtained (e.g., by the data processing module 512 of FIG. 5) based at least in part on determining that the item relates to the user request. For example, a query may be derived from the user request and executed against an item database to identify one or more items that related to the query. A top-most item (e.g., an item being determined to have the highest relation) may be selected and a title for the item may be retrieved from the database.

At 808, a shortened title for the item comprising one or more segments of the title as identified by a machine-learning model may be obtained (e.g., utilizing the modules 502 of FIG. 5). In some embodiments, the machine-learning model may have been previously trained to identify one or more segments of an input title.

At 810, the shortened title (or other output generated by the output manager 522 of FIG. 5) may be provided as output (audio output, textual output, etc.) at a user device (e.g., via a speaker and/or display of the user device).

Figure 9:
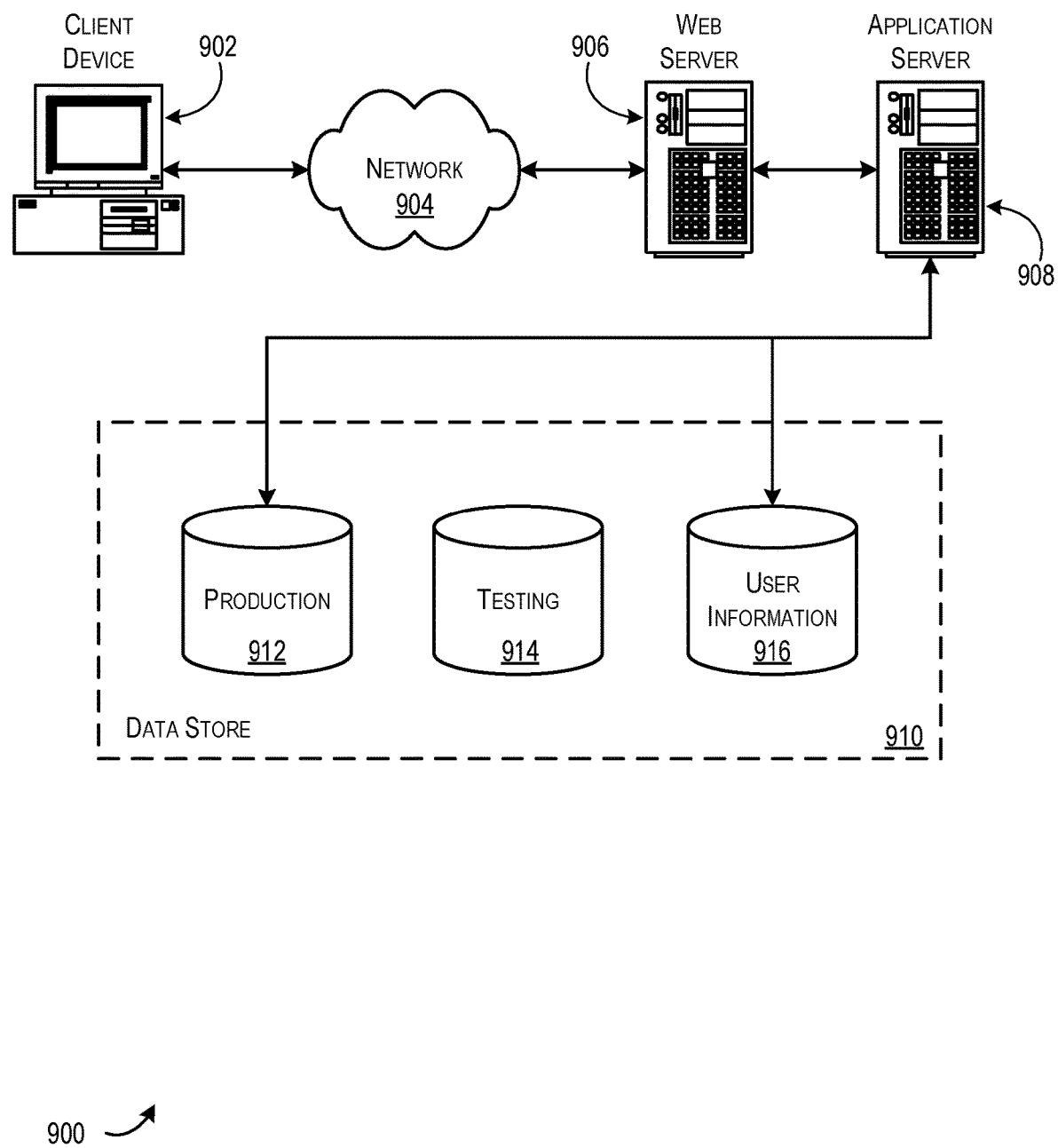
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computing system, training data comprising a set of titles corresponding to a set of items of an electronic catalog, the training data further comprising a corresponding set of one or more segments corresponding to each title;
    training, by the computing system, a machine-learning model to identify one or more segments of an input title, the machine-learning model being trained utilizing the training data and a supervised learning technique;
    receiving, by the computing system, a user request;
    determining, by the computing system, a contextual intent for the user request received by the computing system based at least in part on contextual intent identification protocol;
    identifying, by the computing system, an item of the electronic catalog based at least in part on the user request provided to the computing system;
    identifying, by the computing system, a title for the item;
    obtaining, by the computing system, a set of segments of the title for the item based at least in part on providing the title as an input to the machine-learning model;
    generating, by the computing system, a shortened title based at least in part on selecting a subset of segments from the set of segments, the subset of segments being selected based at least in part on the contextual intent and a segment selection protocol; and
    providing, by the computing system, the shortened title as output in response to the user request.

2. The computer-implemented method of claim 1, further comprising:
    receiving feedback data indicating a perceived accuracy of the machine-learning model in identifying segments, the feedback data being provided by a crowd-sourced group of users; and
    updating the machine-learning model based at least in part on the feedback data.

3. The computer-implemented method of claim 2, wherein an individual segment comprises one or more related tokens.

4. The computer-implemented method of claim 1, wherein an individual segment of the set of segments corresponds to an attribute of the item.

5. A computing device, comprising:
    one or more processors; and
    a memory storing executable instructions that, upon execution by the one or more processors, cause the computing device to, at least:
        receive a user request from a user device;
        identify a contextual intent for the user request based at least in part on a contextual intent identification protocol;
        identify an item of an electronic catalog based at least in part on the user request;
        obtain a title for the item from a database associated with the electronic catalog;
        provide the title for the item to a machine-learning model, the machine-learning model having been previously trained to identify one or more segments of an input title, the machine-learning model being trained using a supervised learning technique and training data comprising a set of titles corresponding to a set of items of the electronic catalog and a corresponding set of one or more segments corresponding to each title;
        receive a set of one or more segments of the title as output from the machine-learning model;
        generate a shortened title for the item, the shortened title comprising a subset of the set of one or more segments of the title, the shortened title being generated based at least in part on a segment selection protocol and the contextual intent of the user request; and provide output to the user device comprising the shortened title.

6. The computing device of claim 5, wherein the machine-learning model identifies the one or more segments of the input title based at least in part on a set of predetermined punctuation symbols.

7. The computing device of claim 5, wherein the machine-learning model is a feed forward neural network.

8. The computing device of claim 5, wherein executing the instructions further causes the computing device to select particular segments of the set of one or more segments to generate the shortened title based at least in part on the contextual intent for the user request, wherein the segment selection protocol specifies one or more rules for generating shortened titles from input segments.

9. The computing device of claim 5, wherein the set of one or more segments individually correspond with an attributes associated with the item, and wherein the segment selection protocol further specifies one or more rules for generating shortened titles from input segments and based at least in part on a particular attribute to which each input segment corresponds.

10. The computing device of claim 5, wherein the subset of the one or more segments of the title appear in a different order from an order of appearance within the title.

11. The computing device of claim 5, wherein the user request is provided vocally at the user device.

12. The computing device of claim 5, wherein determining the contextual intent for the user request is based at least in part on a predetermined set of words, phrases, or regular expressions.

13. The computing device of claim 5, wherein the machine-learning model identifies the segments based at least in part on a set of predetermined punctuation symbols, a set of predetermined regular expressions, and a predetermined word set.

14. A non-transitory computer-readable storage medium having stored thereon computer-executable instructions that, when executed by a processor of a computer system, causes the computer system to perform operations comprising:
   receiving, from a user device, user input data indicative of a user request;
   identifying a contextual intent of the user request based at least in part on a contextual intent identification protocol;
   obtaining a title associated with an item of an electronic catalog based at least in part on determining that the item relates to the user request;
   obtaining, based at least in part on the contextual intent, a shortened title for the item comprising one or more segments of the title, the one or more segments being identified by a machine-learning model that has been previously trained to identify segments from an input title, the machine-learning model being previously trained using a supervised learning technique and training data comprising a set of titles corresponding to a set of items of the electronic catalog and a corresponding set of one or more segments corresponding to each title; and
   providing the shortened title for the item to the user device.

15. The non-transitory computer-readable storage medium of claim 14, wherein the operations further comprise selecting the one or more segments to include in the shortened title from a plurality of segments identified by the machine-learning model, the one or more segments being selected based at least in part on a segment selection protocol.

16. The non-transitory computer-readable storage medium of claim 15, wherein the segment selection protocol specifies one or more rules for generating a one or more shortened titles having a variety of title lengths from a given title.

17. The non-transitory computer-readable storage medium of claim 16, wherein the segment selection protocol further specifies a particular number of tokens to include in the shortened title based at least in part on the contextual intent of the user request.

18. The non-transitory computer-readable storage medium of claim 15, wherein obtaining the shortened title comprises:
   providing the one or more segments and the contextual intent to a segment selection model, the segment selection model being a different machine-learning model, the segment selection model being previously trained from historical data to generate shortened titles based at least in part on one or more input segments and an input contextual intent; and
   receiving the shortened title as output from the segment selection model.

19. The non-transitory computer-readable storage medium of claim 15, wherein the operations further comprise:
   identifying a first relationship between a first item attribute and a first segment of the title; and
   identifying a second relationship between a second item attribute and a second segment of the title, wherein the first segment is included in the shortened title and the second segment is excluded from the shortened title based at least in part on the first relationship and the second relationship.

20. The non-transitory computer-readable storage medium of claim 19, wherein a selection protocol utilized to generate the item specifies attribute ranking identifying a preference to include a segment related to the first item attribute over a segment related to the second item attribute.

* * * * *

UNITED STATES PATENT AND TRADEMARK OFFICE
CERTIFICATE OF CORRECTION

PATENT NO. : 11,087,742 B1  
APPLICATION NO. : 16/439388  
DATED : August 10, 2021  
INVENTOR(S) : Levy et al.

Page 1 of 1

It is certified that error appears in the above-identified patent and that said Letters Patent is hereby corrected as shown below:

In the Claims

Column 37, Line 17, Claim 9:  
Delete: "or more segments individually correspond with an attributes associated with the item"  
Insert: --or more segments individually correspond with an attribute associated with the item--

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*